(12) United States Patent
Sakai et al.

(10) Patent No.: US 10,146,093 B2
(45) Date of Patent: Dec. 4, 2018

(54) MIRROR DISPLAY

(71) Applicant: SHARP KABUSHIKI KAISHA, Sakai, Osaka (JP)

(72) Inventors: Akira Sakai, Sakai (JP); Hiroyuki Hakoi, Sakai (JP); Masahiro Hasegawa, Sakai (JP); Kiyoshi Minoura, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 15/559,820

(22) PCT Filed: Feb. 15, 2016

(86) PCT No.: PCT/JP2016/054227
§ 371 (c)(1),
(2) Date: Sep. 19, 2017

(87) PCT Pub. No.: WO2016/152311
PCT Pub. Date: Sep. 29, 2016

(65) Prior Publication Data
US 2018/0052346 A1  Feb. 22, 2018

(30) Foreign Application Priority Data

Mar. 20, 2015 (JP) ................. 2015-058312

(51) Int. Cl.
*G02F 1/1335* (2006.01)
*G02F 1/1347* (2006.01)
(Continued)

(52) U.S. Cl.
CPC .......... *G02F 1/1347* (2013.01); *G02F 1/1393* (2013.01); *G02F 1/133536* (2013.01);
(Continued)

(58) Field of Classification Search
CPC ................. G02F 1/1347; G02F 1/1393; G02F 1/133536; G02F 1/133555; G02F 2001/133557
See application file for complete search history.

(56) References Cited

U.S. PATENT DOCUMENTS

| | | |
|---|---|---|
| 2004/0051827 A1 | 3/2004 | Hinata et al. |
| 2004/0100598 A1 | 5/2004 | Adachi et al. |
| 2015/0177563 A1 | 6/2015 | Cho et al. |

FOREIGN PATENT DOCUMENTS

| | | |
|---|---|---|
| JP | 11-15392 A | 1/1999 |
| JP | 3419766 B2 | 6/2003 |

(Continued)

*Primary Examiner* — Thanh-Nhan P Nguyen
(74) *Attorney, Agent, or Firm* — ScienBiziP, P.C.

(57) ABSTRACT

The present invention provides a mirror display that exhibits non-deteriorated display quality in a display mode and is capable of adjusting the color of reflected light in a mirror mode. The mirror display includes, in the following order from the back surface side: a display device including a polarizing plate; a reflective polarizing plate; a birefringence mode liquid crystal display panel; and an absorptive polarizing plate, the reflective polarizing plate including a transmission axis parallel to the transmission axis of the absorptive polarizing plate, the liquid crystal display panel being capable of switching, in transmission of incident polarized light, between a non-coloring mode of not altering the polarization state of the polarized light and a coloring mode of altering the polarization state of the polarized light, the liquid crystal display panel selecting the coloring mode when the display device is in a non-display state, the liquid crystal display panel in the coloring mode increasing a retardation to a value greater than 275 nm in measurement with light having a wavelength of 550 nm.

4 Claims, 11 Drawing Sheets

(51) Int. Cl.
*G02F 1/139* (2006.01)
*G02F 1/137* (2006.01)

(52) U.S. Cl.
CPC ............... *G02F 1/133528* (2013.01); *G02F 2001/13478* (2013.01); *G02F 2001/13712* (2013.01); *G02F 2001/133531* (2013.01); *G02F 2203/07* (2013.01)

(56) References Cited

FOREIGN PATENT DOCUMENTS

| | | |
|---|---|---|
| JP | 2003-241175 A | 8/2003 |
| JP | 2004-085590 A | 3/2004 |

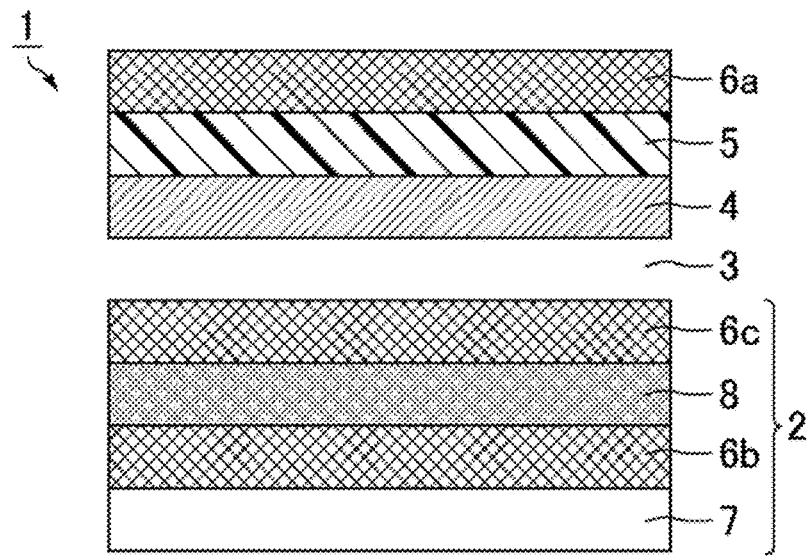
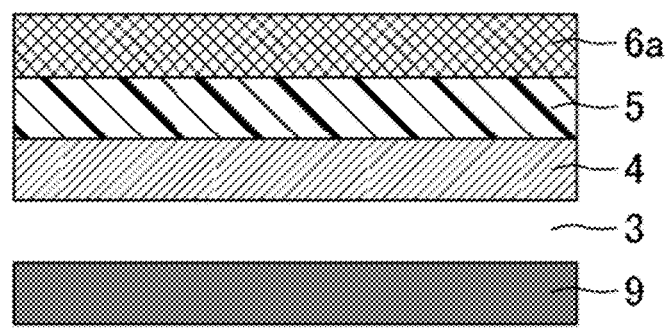
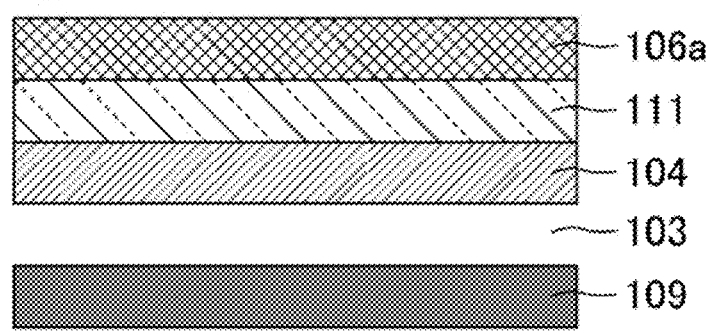

MIRROR DISPLAY

TECHNICAL FIELD

The present invention relates to mirror displays. More specifically, the present invention relates to a mirror display that operates both in a mirror mode functioning as a mirror and in a display mode displaying images.

BACKGROUND ART

Mirror displays for digital signage or the like applications have been proposed which include a half mirror layer on the viewing surface side of a display device to function as a mirror (for example, see Patent Literatures 1 to 4). Such mirror displays provide images using display light emitted from the display devices and are also used as mirrors in a state of reflecting external light.

The half mirror layer is an optical member with a reflective function, such as a known reflective polarizing plate (e.g., multiplayer reflective polarizing plate). A reflective polarizing plate reflects incident polarized light vibrating at an azimuth parallel to the reflection axis and transmits incident polarized light vibrating at an azimuth perpendicular to the reflection axis. The reflective polarizing plate therefore can transmit light emitted from a display device as display light to the viewing surface side and reflect external light perpendicular to the polarization direction of the display light to the viewing surface side. Such a mirror display including a reflective polarizing plate as a half mirror layer switches between a display mode and a mirror mode based on such a principle.

CITATION LIST

Patent Literature

Patent Literature 1: JP 3419766 B
Patent Literature 2: JP 2003-241175 A
Patent Literature 3: JP H11-15392 A
Patent Literature 4: JP 2004-085590 A

SUMMARY OF INVENTION

Technical Problem

Conventional mirror displays, however, are insufficient in the display quality in a display mode. Those mirror displays, being used only as mirrors in a mirror mode, have been desired to have a better design. The reasons therefor are described below.

A half mirror layer disposed on the viewing surface side of a display device reflects a certain percentage of external light in any state (display state or non-display state) of the display device. Such a half mirror layer causes no trouble when used in a place such as a dark room without external light, but can be a problem in an environment with external light because it reflects external light to make the mirror display bright even in the case where the display device provides black display, for example. In other words, external light reflection by a half mirror layer is undesired in a display mode and may deteriorate the display quality (properties such as contrast ratio) of the mirror display.

With a half mirror layer reflecting a certain percentage of external light in any state of the display device, the mirror display has a constant reflectance and a constant hue. The mirror display is therefore not capable of changing the color of the mirror with time (i.e., to color the reflected light) or providing a pattern to the mirror in a mirror mode, for example, and thus exhibits an insufficient design.

The invention disclosed in Patent Literature 1, for example, is a device including a reflective polarization selecting member as a half mirror layer and, on the viewing surface side of the reflective polarization selecting member, a varying part for the polarization axis of transmitted light and an absorptive polarization selecting member in the stated order. Here, the varying part for the polarization axis of transmitted light is defined to be structurally capable of selecting whether or not altering, in transmission of incident linearly polarized light, the polarization state of the light into linearly polarized light whose polarization axis is perpendicular to that of the incident linearly polarized light. The degree of alteration of the polarization state of the linearly polarized light incident on the varying part for the polarization axis of transmitted light in this invention disclosed in Patent Literature 1 is thus independent of the wavelength, so that the device cannot color the reflected light in a mirror mode. The inventions disclosed in Patent Literatures 2 to 4 also fail to color the reflected light.

The present invention has been made in view of such a current state of the art, and aims to provide a mirror display that exhibits non-deteriorated display quality in a display mode and is capable of adjusting the color of reflected light in a mirror mode.

Solution to Problem

The inventors have made various studies on mirror displays that exhibit non-deteriorated display quality in a display mode and are capable of adjusting the color of reflected light in a mirror mode. The inventors have then focused on a structure in which a reflective polarizing plate, a liquid crystal display panel, and an absorptive polarizing plate are disposed in the stated order on the viewing surface side of the display device. As a result, the inventors have found a mirror display having a structure including a reflective polarizing plate and an absorptive polarizing plate whose transmission axes are parallel to each other and a birefringence mode liquid crystal display panel which, in transmission of incident polarized light, is capable of switching between a mode of not altering the polarization state of the light and a mode of altering the polarization state of the light, wherein the liquid crystal display panel introduces certain retardation in the mode of altering the polarization state. Thereby, the inventors have arrived at a solution to the above problem, completing the present invention.

One aspect of the present invention may be a mirror display including, in the following order from the back surface side: a display device including a polarizing plate; a reflective polarizing plate; a birefringence mode liquid crystal display panel; and an absorptive polarizing plate, the reflective polarizing plate including a transmission axis parallel to the transmission axis of the absorptive polarizing plate, the liquid crystal display panel being capable of switching, in transmission of incident polarized light, between a non-coloring mode of not altering the polarization state of the polarized light and a coloring mode of altering the polarization state of the polarized light, the liquid crystal display panel selecting the coloring mode when the display device is in a non-display state, the liquid crystal display panel in the coloring mode increasing a retardation to a value greater than 275 nm in measurement with light having a wavelength of 550 nm.

Advantageous Effects of Invention

The present invention can provide a mirror display that exhibits non-deteriorated display quality in a display mode and is capable of adjusting the color of reflected light in a mirror mode.

BRIEF DESCRIPTION OF DRAWINGS

FIG. 1 is a schematic cross-sectional view of a mirror display of Embodiment 1.

FIG. 2 is a schematic cross-sectional view of a simulation sample of a mirror display of Example 1.

FIG. 3 is a schematic cross-sectional view of a simulation sample of a mirror display of Comparative Example 1.

DESCRIPTION OF EMBODIMENTS

Figure 4:
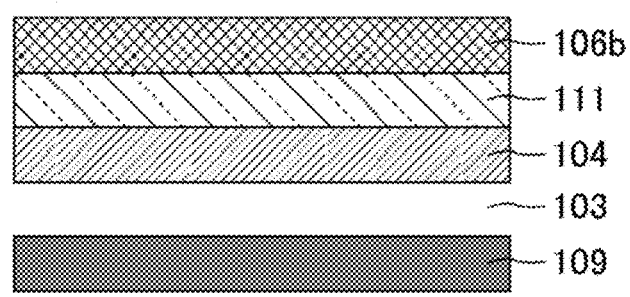
FIG. 4 is a schematic cross-sectional view of a simulation sample of a mirror display of Comparative Example 2.

The present invention is described below in more detail based on embodiments with reference to the drawings. The embodiments, however, are not intended to limit the scope of the present invention. In the following description, portions having the same or similar functions in different drawings are indicated by similar reference signs (some with an alphabet letter), and are not repeatedly described. The configurations employed in the embodiments may appropriately be combined or modified within the spirit of the present invention.

Although the following embodiments describe cases where a liquid crystal display device is used as a display device, the display device may be of any type and may be a display device emitting polarized light other than a liquid crystal display device. The polarizing plates in the display device are each an absorptive polarizing plate or a reflective polarizing plate and do not refer to a special polarizing plate other than these polarizing plates. The absorptive polarizing plate and the reflective polarizing plate each encompass a linear polarizing plate and a circular polarizing plate (linear polarizing plate on which a λ/4 plate is stacked). For example, a linear polarizing plate encompassed by the absorptive polarizing plate is typically denoted as an absorptive polarizing plate (without the term "linear"). Meanwhile, a circular polarizing plate encompassed by the absorptive polarizing plate can also be denoted as an absorptive circular polarizing plate.

A "display mode" herein means a state where display light is emitted from a display device (display state) and the display light reaches the viewing surface side of the mirror display. A "mirror mode" herein means a state in which no display light is emitted from a display device (non-display state).

[Embodiment 1]

FIG. 1 is a schematic cross-sectional view of a mirror display of Embodiment 1. As illustrated in FIG. 1, a mirror display 1 includes a liquid crystal display device 2, an air layer 3, a reflective polarizing plate 4, a birefringence mode liquid crystal display panel 5, and an absorptive polarizing plate 6a in the stated order from the back surface side to the viewing surface side. The reflective polarizing plate 4, the birefringence mode liquid crystal display panel 5, and the absorptive polarizing plate 6a are attached to each other with a pressure-sensitive adhesive (not illustrated). The liquid crystal display device 2 and the workpiece obtained by attachment as described above are fixed by fitting the upper and lower edges of the workpiece to paired frame-like aluminum rails mounted to the upper and lower edges of the liquid crystal display device 2. The air layer 3 is a space formed in a slight gap between the liquid crystal display device 2 and the reflective polarizing plate 4. The "viewing surface side" herein means the top side of the mirror display 1 in FIG. 1. The "back surface side" herein means the bottom side of the mirror display 1 in FIG. 1. The same shall apply to the other drawings.

The liquid crystal display device 2 includes a backlight 7, an absorptive polarizing plate 6b, a liquid crystal display panel 8 for display, and an absorptive polarizing plate 6c in the stated order from the back surface side to the viewing surface side. The absorptive polarizing plate 6b is attached to the back surface side of the liquid crystal display panel 8 for display with a pressure-sensitive adhesive (not illustrated). The absorptive polarizing plate 6c is attached to the viewing surface side of the liquid crystal display panel 8 for display with a pressure-sensitive adhesive (not illustrated). The liquid crystal display device 2 may appropriately include a member such as a bezel in the frame region. The bezel is preferably made of a black plastic resin.

The backlight 7 may be of any type such as an edge-lit backlight or a direct-lit backlight. The display light source of the backlight 7 may be of any type such as light emitting diodes (LEDs) or cold cathode fluorescent lamps (CCFLs).

The absorptive polarizing plate 6a, the absorptive polarizing plate 6b, and the absorptive polarizing plate 6c may each be, for example, a plate obtained by adsorption alignment of a dichroic anisotropic material such as an iodine complex on a polyvinyl alcohol (PVA) film. An absorptive polarizing plate has a function of absorbing incident polarized light vibrating at an azimuth parallel to its absorption axis and transmits incident polarized light vibrating at an azimuth perpendicular to its absorption axis.

The liquid crystal display panel 8 for display has a configuration including a liquid crystal layer held between paired substrates (not illustrated). The paired substrates constituting the liquid crystal display panel 8 for display are attached to each other with a sealant (not illustrated) to hold the liquid crystal layer in between.

The paired substrates constituting the liquid crystal display panel 8 for display may be of any type such as a thin-film transistor array substrate and a color filter substrate in combination.

The thin-film transistor array substrate may have a configuration including, for example, various conductive lines such as thin-film transistors on a glass substrate, or on a transparent substrate such as a plastic substrate instead of a glass substrate. The thin-film transistors each include a semiconductor layer which may contain, without limitation, amorphous silicon, low-temperature polysilicon, or oxide semiconductor. Examples of the oxide semiconductor include compounds containing indium, gallium, zinc, and oxygen and compounds containing indium, zinc, and oxygen. In the case of using as the oxide semiconductor a compound containing indium, gallium, zinc, and oxygen which has a low off-leakage current, application of voltage to the oxide semiconductor enables paused drive in which the voltage is held until the next data is input. A compound containing indium, gallium, zinc, and oxygen is therefore preferred as the oxide semiconductor in terms of low power consumption.

The color filter substrate may have a configuration including, for example, a color filter layer disposed on a glass substrate, or on a transparent substrate such as a plastic substrate instead of a glass substrate. The combination of colors for the color filter layer may be, but is not particularly limited to, a combination of red, green, and blue, or a combination of red, green, blue, and yellow.

The display mode of the liquid crystal display panel 8 for display may be, but is not particularly limited to, a twisted nematic (TN) mode, a vertical alignment (VA) mode, an in-plane switching (IPS) mode, or a fringe field switching (FFS) mode.

For example, the TN mode is a display mode in which when voltage is applied, liquid crystal molecules aligned with a 90° twist between and parallel to paired substrates shift in the direction perpendicular to the substrate surfaces, thereby changing the amount of transmitted light. In a TN mode liquid crystal display panel with no voltage applied, linearly polarized light emerging from a polarizing plate (for example, absorptive polarizing plate 6b) disposed on the back surface side of the panel travels along the twisted liquid crystal molecules, eventually demonstrating 90° azimuth rotation. This phenomenon is called optical rotation. The TN mode is a display mode utilizing optical rotation. When no voltage is applied, a TN mode liquid crystal display panel provides white display in the state where the transmission axis of the polarizing plate (for example, absorptive polarizing plate 6b) disposed on the back surface side of the panel and the transmission axis of the polarizing plate (for example, absorptive polarizing plate 6c) disposed on the viewing surface side of the panel are perpendicular to each other, and provides black display in the state where the transmission axes are parallel to each other. When sufficient voltage is applied, the twisted configuration is broken as the liquid crystal molecules shift in the direction perpendicular to the substrate surfaces, so that the optical rotation is lost. In this case, the TN mode liquid crystal display panel provides black display in the state where the transmission axis of the polarizing plate (for example, absorptive polarizing plate 6b) disposed on the back surface side of the panel and the transmission axis of the polarizing plate (for example, absorptive polarizing plate 6c) disposed on the viewing surface side of the panel are perpendicular to each other, and provides white display in the state where the transmission axes are parallel to each other. Though the details are described later, optical rotation involves small wavelength dispersion (wavelength dependence), and thus the display light in the TN mode has an achromatic color, with or without voltage applied.

The relationship between the transmission axis of the absorptive polarizing plate 6b and the transmission axis of the absorptive polarizing plate 6c can appropriately be designed to suit the display mode of the liquid crystal display panel 8 for display. For achievement of both the visibility of images in a display mode and the visibility of mirror images in a mirror mode, the transmission axis of the absorptive polarizing plate 6c is preferably parallel to the transmission axis of the reflective polarizing plate 4. The absorptive polarizing plate 6c may be excluded and the functions thereof may alternatively be conducted by the reflective polarizing plate 4. Yet, since the degree of polarization of a reflective polarizing plate is typically lower than that of an absorptive polarizing plate, exclusion of the absorptive polarizing plate 6c causes a decrease in the contrast ratio in the display mode. Conversely, a sufficient degree of polarization of the reflective polarizing plate 4 allows exclusion of the absorptive polarizing plate 6c. In order to exclude the absorptive polarizing plate 6c, the degree of polarization of the reflective polarizing plate 4 is preferably 90% or higher (contrast ratio of 10 or higher), more preferably 99% or higher (contrast ratio of 100 or higher).

The reflective polarizing plate 4 can be, for example, a multilayer reflective polarizing plate, a nano-wire grid polarizing plate, or a reflective polarizing plate utilizing selective reflection of cholesteric liquid crystal. Examples of the multilayer reflective polarizing plate include a reflective polarizing plate (trade name: DBEF) available from Sumitomo 3M Ltd. Examples of the reflective polarizing plate utilizing selective reflection of cholesteric liquid crystal include a reflective polarizing plate (trade name: PCF) available from Nitto Denko Corporation. The reflectance and transmittance of the reflective polarizing plate 4 are not particularly limited, and may be adjusted as desired by stacking two or more reflective polarizing plates on each other with their transmission axes shifted from each other. The "reflectance" herein means luminous reflectance, unless otherwise specified.

The transmission axis of the reflective polarizing plate 4 and the transmission axis of the absorptive polarizing plate 6a are parallel to each other. The expression that "two transmission axes are parallel to each other" herein means that the angle formed by the transmission axis of one of the plates and the transmission axis of the other plate is within the range of 0±3°, preferably in the range of 0±1°, more preferably in the range of 0±0.5°, particularly preferably 0° (perfectly parallel to each other).

To display images, the birefringence mode liquid crystal display panel 5 does not utilize optical rotation used in the TN mode liquid crystal display panel described above but utilizes birefringence of liquid crystal molecules and thereby controls the transmittance of light. The birefringence mode is a mode in which variable voltage is applied to the liquid crystal molecules so that the retardation is changed. In a birefringence mode liquid crystal display panel, the birefringence in the liquid crystal display panel alters the polarization state of linearly polarized light emerging from the polarizing plate (for example, reflective polarizing plate 4) disposed on the back surface side of the panel and converts the light usually into elliptically polarized light having an ellipticity corresponding to the retardation introduced. Accordingly, the amount of the converted elliptically polarized light passing through the polarizing plate (for example, absorptive polarizing plate 6a) disposed on the viewing surface side of the birefringence mode liquid crystal display panel depends on the ellipticity of the elliptically polarized light, i.e., the applied voltage.

The birefringence mode liquid crystal display panel 5 may be any panel that utilizes birefringence to control the transmittance of light, and may be, for example, a VA mode, IPS mode, FFS mode, or electrically controlled birefringence (ECB) mode liquid crystal display panel.

For example, a VA mode liquid crystal display panel aligns liquid crystal molecules having negative anisotropy of dielectric constant perpendicularly to the substrate surfaces when no voltage is applied. A VA mode liquid crystal display panel has a retardation of zero when no voltage is applied. In the state where the transmission axis of a polarizing plate (for example, reflective polarizing plate 4) disposed on the back surface side of the panel and the transmission axis of a polarizing plate (for example, absorptive polarizing plate 6a) disposed on the viewing surface side of the panel are parallel to each other, the VA mode liquid crystal display panel transmits polarized light vibrating at an azimuth parallel to both of the transmission axes without altering the polarization state. As a result, white display, i.e., achromatic color display is obtained. In contrast, in the state where the transmission axis of the polarizing plate (for example, reflective polarizing plate 4) disposed on the back surface side and the transmission axis of the polarizing plate (for example, absorptive polarizing plate 6a) disposed on the viewing surface side are perpendicular to each other, display light does not reach the viewing surface side and thus black display is provided. Here, application of voltage gradually tilts the liquid crystal molecules in the direction parallel to the substrate surfaces, thereby gradually increasing the retardation. As a result, the display becomes gradually darker, and the transmittance of light having a wavelength of 550 nm becomes minimum when the retardation is 275 nm, for example. The transmittance of light here is proportional to the formula $[\cos(\pi \times R/\lambda)]^2$ wherein R is the retardation of a medium in a configuration including two polarizing plates whose transmission axes are parallel to each other and the medium disposed between the plates, and $\lambda$ is the wavelength of light incident on the configuration. For example, when the retardation R is half the wavelength $\lambda$, the minimum transmittance is obtained. It should be noted that light having a wavelength of 550 nm is light having a wavelength at which the human sensitivity, a luminosity factor, is highest.

An ECB mode liquid crystal display panel, for example, aligns liquid crystal molecules parallel to the substrate surfaces when no voltage is applied. In an ECB mode liquid crystal display panel with no voltage applied, the retardation is not zero and the transmittance of light having a wavelength of 550 nm is minimum when the retardation is 275 nm, for example. Application of voltage causes the liquid crystal molecules to shift in the direction perpendicular to the substrate surfaces to lead to a non-birefringence state, i.e., giving a retardation of zero. In the state where the transmission axis of the polarizing plate (for example, reflective polarizing plate 4) disposed on the back surface side of the panel and the transmission axis of the polarizing plate (for example, absorptive polarizing plate 6a) disposed on the viewing surface side of the panel are parallel to each other when voltage is applied, the ECB mode liquid crystal display panel transmits polarized light vibrating at an azimuth parallel to the transmission axes without altering the polarization state. As a result, white display, i.e., achromatic color display is obtained. In contrast, in the state where the transmission axis of the polarizing plate (for example, reflective polarizing plate 4) disposed on the back surface side and the transmission axis of the polarizing plate (for example, absorptive polarizing plate 6a) disposed on the viewing surface side are perpendicular to each other, display light does not reach the viewing surface side and thus black display is provided.

The birefringence effects described above, i.e., the effects such as the effect of altering the polarization state of the incident polarized light and the effect of changing the transmittance thereof involve large wavelength dispersion. The birefringence mode liquid crystal display panel 5 therefore generally cannot provide achromatic color display except for cases where the retardation is zero, differently from a TN mode liquid crystal display panel (optical rotation mode liquid crystal display panel) providing achromatic color display with or without voltage applied.

The mirror display of Embodiment 1 may have a configuration in which the liquid crystal display device 2 and the reflective polarizing plate 4 are integrally attached to each other with a pressure-sensitive adhesive, i.e., a configuration including no air layer 3. For sufficient achievement of the birefringence effects, any layer diffusing incident light (for example, polarized light diffusing layer) is preferably not disposed between the reflective polarizing plate 4 and the birefringence mode liquid crystal display panel 5.

The mirror display of Embodiment 1 can be operated based on the following principle depending on the state of the birefringence mode liquid crystal display panel 5. Hereinafter, a mode in which the birefringence mode liquid crystal display panel 5 does not alter the polarization state of incident polarized light is referred to as a non-coloring mode, and a mode in which the birefringence mode liquid crystal display panel 5 alters the polarization state is referred to as a coloring mode.

(Non-coloring Mode)

The non-coloring mode is the state where the retardation of the birefringence mode liquid crystal display panel 5 is zero. Here, since the transmission axis of the reflective polarizing plate 4 and the transmission axis of the absorptive polarizing plate 6a are parallel to each other, the birefringence mode liquid crystal display panel 5 transmits polarized light vibrating at an azimuth parallel to both of the transmission axes without altering the polarization state. Such a non-coloring mode corresponds to, for example, the state with no voltage applied in a VA mode liquid crystal display panel (state where sufficient voltage is not applied so as to prevent generation of retardation) and the state with voltage applied in an ECB mode liquid crystal display panel (state where sufficient voltage is applied so as to prevent generation of retardation). Here, in order to display an image on the liquid crystal display panel 8 for display (display mode), the transmission axis of the reflective polarizing plate 4 needs to be parallel to the azimuth of the polarized light emitted from the liquid crystal display device 2, i.e., the transmission axis of the absorptive polarizing plate 6c and the transmission axis of the reflective polarizing plate 4 need to be parallel to each other, so that the birefringence mode liquid crystal display panel 5 transmits polarized light emitted from the liquid crystal display device 2 without altering the polarization state. In other words, even with the birefringence mode liquid crystal display panel 5, the reflective polarizing plate 4, and the absorptive polarizing plate 6a, the viewer can perceive the image displayed on the liquid crystal display panel 8 for display as if these members are not disposed.

Meanwhile, external light incident on the absorptive polarizing plate 6a from the viewing surface side which vibrates at an azimuth parallel to the transmission axis of the absorptive polarizing plate 6a passes through the absorptive polarizing plate 6a to be converted into linearly polarized light. The linearly polarized light emerging from the absorptive polarizing plate 6a passes through the birefringence mode liquid crystal display panel 5 without being affected by the birefringence, i.e., with being kept in its linearly polarized state. Having passed through the birefringence mode liquid crystal display panel 5, the linearly polarized light passes through the reflective polarizing plate 4 whose transmission axis is parallel to the transmission axis of the absorptive polarizing plate 6a. The linearly polarized light coming from the reflective polarizing plate 4 is then absorbed by the members constituting the liquid crystal display device 2. For example, in the case where the liquid crystal display panel 8 for display is a TN mode liquid crystal display panel, the transmission axis of the absorptive polarizing plate 6b and the transmission axis of the absorptive polarizing plate 6c are perpendicular to each other, and the transmission axis of the absorptive polarizing plate 6c and the transmission axis of the reflective polarizing plate 4 are parallel to each other, the light is absorbed by the absorptive polarizing plate 6b or the members included in the TN mode liquid crystal display panel (liquid crystal display panel 8 for display) such as a color filter layer and a black matrix.

As described above, the mirror display of Embodiment 1 in the non-coloring mode can provide high-luminance display without deterioration of the display quality due to external light reflection by the reflective polarizing plate 4. That is, the mirror display of Embodiment 1 in the display mode can achieve the display quality of the same level as the liquid crystal display device 2. In the non-coloring mode, the liquid crystal display device 2 may be in the non-display state.

(Coloring Mode)

The coloring mode is a state where the retardation of the birefringence mode liquid crystal display panel 5 is not zero. Such a coloring mode corresponds to, for example, the state with voltage applied in a VA mode liquid crystal display panel (state where sufficient voltage is applied so as to cause retardation) and the state with no voltage applied in an ECB mode liquid crystal display panel (state where sufficient voltage is not applied so as to cause retardation). The coloring mode is selected when the liquid crystal display device 2 is in the non-display state (mirror mode). The non-display state may entirely or partially affect the screen of the liquid crystal display device 2. In this case, the liquid crystal display panel 8 for display preferably entirely or partially provides no display to its screen. The state of providing no display encompasses a state of emitting no display light from the liquid crystal display device 2 by providing black display or turning off or dimming the backlight 7.

Meanwhile, external light incident on the absorptive polarizing plate 6a from the viewing surface side which vibrates at an azimuth parallel to the transmission axis of the absorptive polarizing plate 6a passes through the absorptive polarizing plate 6a to be converted into linearly polarized light. The linearly polarized light emerging from the absorptive polarizing plate 6a passes through the birefringence mode liquid crystal display panel 5 to be converted into elliptically polarized light by the birefringence effects. The elliptically polarized light coming from the birefringence mode liquid crystal display panel 5 which vibrates at an azimuth parallel to the transmission axis of the reflective polarizing plate 4 passes through the reflective polarizing plate 4 and is then absorbed by the members constituting the liquid crystal display device 2. In contrast, the elliptically polarized light coming from the birefringence mode liquid crystal display panel 5 which vibrates at an azimuth parallel to the reflection axis of the reflective polarizing plate 4 (perpendicular to the transmission axis) is reflected as linearly polarized light by the reflective polarizing plate 4. The linearly polarized light reflected by the reflective polarizing plate 4 passes through the birefringence mode liquid crystal display panel 5 and is converted into elliptically polarized light by the birefringence effects. The elliptically polarized light coming from the birefringence mode liquid crystal display panel 5 which vibrates at an azimuth parallel to the transmission axis of the absorptive polarizing plate 6a passes through the absorptive polarizing plate 6a to be emitted as reflected light to the viewing surface side. The elliptically polarized light coming from the birefringence mode liquid crystal display panel 5 which vibrates at an azimuth parallel to the absorption axis of the absorptive polarizing plate 6a (perpendicular to the transmission axis) is absorbed by the absorptive polarizing plate 6a.

As described above, the mirror display of Embodiment 1 in the coloring mode can function as a mirror. In addition, since the alternation of the polarization state by the birefringence effects and the accompanying changes in transmittance and reflectance involve large wavelength dispersion, the intensity of reflected light depends on the wavelength. This results in stronger reflection of light having a specific wavelength than reflection of light having another wavelength. In other words, the mirror display of Embodiment 1 in the mirror mode produces reflected light that appears in color.

The case is now described where the transmission axis of the reflective polarizing plate 4 and the transmission axis of the absorptive polarizing plate 6a are perpendicular to each other differently from the mirror display of Embodiment 1. In the non-coloring mode, polarized light emitted from the liquid crystal display device 2 cannot pass through and is absorbed by the absorptive polarizing plate 6a even in the state where the transmission axis of the absorptive polarizing plate 6c and the transmission axis of the reflective polarizing plate 4 are parallel to each other. In other words, display light from the liquid crystal display device 2 does not reach the viewing surface side. Meanwhile, in the coloring mode, the liquid crystal display device 2 is in the non-display state and thus the mirror display cannot be in the display mode. Here, even if the liquid crystal display device 2 is brought into the display state, the mirror display undesirably has colored display light and thus fails to achieve the display quality of the same level as the liquid crystal liquid crystal display device 2. It is therefore important that the transmission axis of the reflective polarizing plate 4 and the transmission axis of the absorptive polarizing plate 6a are parallel to each other.

In the mirror display of Embodiment 1, the color of the reflected light can be adjusted by the effective retardation introduced by the birefringence mode liquid crystal display panel 5. The "effective retardation" (also referred to simply as retardation) herein refers to the retardation observed from the normal direction in the state where a certain level of voltage is applied to the birefringence mode liquid crystal display panel. For example, in a VA mode liquid crystal display panel, the effective retardation is zero because the liquid crystal molecules are aligned perpendicularly to the substrate surfaces when no voltage is applied. Here, application of voltage gradually tilts the liquid crystal molecules in the direction parallel to the substrate surfaces, thereby gradually increasing the effective retardation. When all the liquid crystal molecules are uniformly tilted in the direction parallel to the substrate surfaces, the effective retardation becomes maximum. Here, the maximum effective retardation in principle is represented by $\Delta n d$ (hereinafter, also referred to as liquid crystal retardation) where $\Delta n$ is the refractive index anisotropy of the liquid crystal (liquid crystal layer) constituting the liquid crystal display panel and d is the thickness of the liquid crystal layer.

With the actual configuration and materials of the liquid crystal display panel, it is substantially difficult to align all the liquid crystal molecules uniformly. Typically, the liquid crystal molecules are not uniformly distributed in the thickness direction and/or the horizontal direction of the liquid crystal layer. For example, liquid crystal molecules in the vicinity of the substrate surfaces are less likely to move when voltage is applied due to the alignment force of the alignment films. In contrast, liquid crystal molecules in the vicinity of the center portion in the thickness direction are more likely to move when voltage is applied. Liquid crystal molecules are therefore not uniformly aligned in the thickness direction. Also in a display mode utilizing a transverse electric field, such as the IPS mode or the FFS mode, the electric field direction varies depending on the distance from the electrodes, and thus the liquid crystal molecules are not uniformly aligned in the horizontal direction. For these reasons, the maximum effective retardation is actually not completely the same as, but is slightly lower than, the liquid crystal retardation ($\Delta n d$). It is still true that larger liquid crystal retardation leads to larger maximum effective retardation and thus widens the range of the retardation that can be achieved by the birefringence mode liquid crystal display panel 5. Hence, the liquid crystal retardation of the birefringence mode liquid crystal display panel 5 is most important to adjust the color of reflected light.

As described above, the transmittance of the birefringence mode liquid crystal display panel 5 in principle is minimum when the effective retardation is half the wavelength of incident light. That is, increasing the effective retardation to a value greater than the half of the wavelength of incident light corresponds to sufficiently shifting the alignment state of the liquid crystal molecules. For example, in a VA mode liquid crystal display panel, it corresponds to shifting the alignment of the liquid crystal molecules perpendicular to the substrate surfaces to the alignment parallel to the substrate surfaces. This means that, in the coloring mode, the color of reflected light can be adjusted when the birefringence mode liquid crystal display panel 5 introduces retardation (effective value) greater than the half of the wavelength of incident light. Such retardation of the birefringence mode liquid crystal display panel 5 is usually designed for light having a wavelength of 550 nm at which the human sensitivity, a luminosity factor, is highest. Hence, in the coloring mode, the color of reflected light can be adjusted when the birefringence mode liquid crystal display panel 5 introduces retardation greater than 275 nm in measurement with light having a wavelength of 550 nm. The expression "introducing retardation greater than 275 nm" means increasing the retardation to a value greater than 275 nm, which specifically means increasing the retardation to the maximum value X and the retardation X is a value greater than 275 nm.

Hereinafter, the relationship between the liquid crystal retardation and voltage application conditions of the birefringence mode liquid crystal display panel 5 in the coloring mode (i.e., mirror mode) and the possible colors of reflected light is described based on the simulation results in examples and comparative examples. The present invention is not limited by these examples.

EXAMPLE 1

FIG. 2 is a schematic cross-sectional view of a simulation sample of a mirror display of Example 1. As illustrated in FIG. 2, the simulation sample of Example 1 had the same configuration as the mirror display of Embodiment 1, except that a light absorber 9 was disposed instead of the liquid crystal display device 2. As described above, since the liquid crystal display device 2 substantially functions as a light absorber, in the coloring mode, the liquid crystal display device 2 can be replaced by the light absorber 9 without problems in a simulation.

The members constituting the simulation sample of Example 1 are listed below. The liquid crystal retardation of the birefringence mode liquid crystal display panel 5 is a value measured with light having a wavelength of 550 nm. The azimuths of the transmission axis, reflection axis, and absorption axis and the alignment direction are each defined to be positive (+) in the counterclockwise direction from the reference line (0°) which is the longitudinal direction (long side) of the simulation sample.

(A) Light absorber 9
Black acrylic plate
(B) Reflective Polarizing Plate 4
Reflective polarizing plate (trade name: DBEF) available from Sumitomo 3M Ltd.
Azimuth of transmission axis: −45°
Azimuth of reflection axis: 45°
Thickness: 100 μm
(C) Birefringence Mode Liquid Crystal Display Panel 5
VA mode liquid crystal display panel
Liquid crystal retardation: 400 nm
Alignment direction (direction in which liquid crystal molecules tilt when voltage is applied): 0°
Liquid crystal: nematic liquid crystal
Refractive index anisotropy of liquid crystal: 0.111
Anisotropy of dielectric constant of liquid crystal: −3.2
Elastic modulus K1 of liquid crystal: 13 pN
Elastic modulus K2 of liquid crystal: 7.2 pN Elastic modulus K3 of liquid crystal: 13.7 pN
(D) Absorptive Polarizing Plate 6a
Polarizer obtained by adsorption alignment of iodine complex on PVA film Azimuth of transmission axis: −45°
Azimuth of absorption axis: 45°
Thickness: 25 μm

EXAMPLE 2

The simulation sample used was similar to that of Example 1, except that the liquid crystal retardation of the birefringence mode liquid crystal display panel 5 was 600 nm.

EXAMPLE 3

The simulation sample used was similar to that of Example 1, except that the liquid crystal retardation of the birefringence mode liquid crystal display panel 5 was 800 nm.

EXAMPLE 4

The simulation sample used was similar to that of Example 1, except that the liquid crystal retardation of the birefringence mode liquid crystal display panel 5 was 1000 nm.

COMPARATIVE EXAMPLE 1

FIG. 3 is a schematic cross-sectional view of a simulation sample of a mirror display of Comparative Example 1. As illustrated in FIG. 3, the simulation sample of Comparative Example 1 had a configuration including a light absorber 109, an air layer 103, a reflective polarizing plate 104, an optical rotation mode liquid crystal display panel 111, and an absorptive polarizing plate 106a in the stated order from the back surface side to the viewing surface side. For similar reasons to those described in Example 1, a simulation can be conducted using the light absorber 109 as the display device (liquid crystal display device) without any problems.

The members constituting the simulation sample of Comparative Example 1 are listed below. The liquid crystal retardation of the optical rotation mode liquid crystal display panel 111 is a value measured with light having a wavelength of 550 nm. Also, the azimuths of the transmission axis, reflection axis, and absorption axis and the rubbing direction are each defined to be positive (+) in the counter-clockwise direction from the reference line (0°) which is the longitudinal direction (long side) of the simulation sample.
(A) Light Absorber 109
Black acrylic plate
(B) Reflective Polarizing Plate 104
Reflective polarizing plate (trade name: DBEF) available from Sumitomo 3M Ltd.
Azimuth of transmission axis: −45°
Azimuth of reflection axis: 45°
Thickness: 100 μm
(C) Optical Rotation Mode Liquid Crystal Display Panel 111
TN mode liquid crystal display panel
Liquid crystal retardation: 476 nm (condition under which ideal optical rotation is achieved in the TN mode)
Rubbing direction of viewing surface side substrate: 45°
Rubbing direction of back surface side substrate: −45°
Liquid crystal: nematic liquid crystal
Refractive index anisotropy of liquid crystal: 0.087
Anisotropy of dielectric constant of liquid crystal: 7.3
Elastic modulus K1 of liquid crystal: 11.5 pN
Elastic modulus K2 of liquid crystal: 10 pN
Elastic modulus K3 of liquid crystal: 16.7 pN
(D) Absorptive Polarizing Plate 106a
Polarizer obtained by adsorption alignment of iodine complex on PVA film
Azimuth of transmission axis: 45°
Azimuth of absorption axis: −45°
Thickness: 25 m The optical rotation mode liquid crystal display panel 111 used was a TN mode liquid crystal display panel in which the transmission axis of the reflective polarizing plate 104 disposed on the back surface side of the panel and the transmission axis of the absorptive polarizing plate 106a disposed on the viewing surface side of the panel were perpendicular to each other. Such arrangement of the members enables a normally white configuration. In other words, when no voltage is applied, the optical rotation mode liquid crystal display panel 111 in the mirror display of Comparative Example 1 transmits display light from the back surface side (display device) to the viewing surface side and does not reflect external light from the viewing surface side. In contrast, when sufficient voltage is applied, the optical rotation mode liquid crystal display panel 111 reflects external light from the viewing surface side to the viewing surface side, i.e., can be operated in the mirror mode.

COMPARATIVE EXAMPLE 2

FIG. 4 is a schematic cross-sectional view of a simulation sample of a mirror display of Comparative Example 2. As illustrated in FIG. 4, the simulation sample of Comparative Example 2 has a configuration including the light absorber 109, the air layer 103, the reflective polarizing plate 104, the optical rotation mode liquid crystal display panel 111, and an absorptive polarizing plate 106b in the stated order from the back surface side to the viewing surface side.

The members constituting the simulation sample of Comparative Example 2 were similar to those in Comparative Example 1, except that the azimuth of the transmission axis of the absorptive polarizing plate 106b was set to −45° and the azimuth of the absorption axis was set to 45°.

The optical rotation mode liquid crystal display panel 111 used was a TN mode liquid crystal display panel in which the transmission axis of the reflective polarizing plate 104 disposed on the back surface side of the panel and the transmission axis of the absorptive polarizing plate 106b disposed on the viewing surface side were parallel to each other. Such arrangement of the members enables a normally black configuration. In other words, when no voltage is applied, the optical rotation mode liquid crystal display panel 111 in the mirror display of Comparative Example 2 reflects external light from the viewing surface side to the viewing surface side, i.e., can be operated in the mirror mode. In contrast, when sufficient voltage is applied, the optical rotation mode liquid crystal display panel 111 transmits display light from the back surface side (display device) to the viewing surface side and does not reflect external light from the viewing surface side.
[Preliminary Evaluation with Retardation Film]

Figure 5:
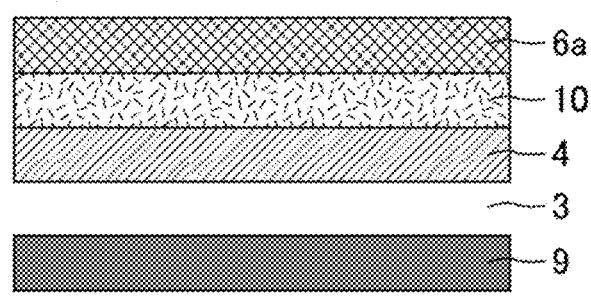
FIG. 5 is a schematic cross-sectional view of an evaluation sample including a retardation film.

First, in order to confirm that the birefringence mode liquid crystal display panel 5 in Examples 1 to 4 can be simulated in the non-coloring mode and the coloring mode, preliminary evaluations (simulations and experiments) were performed using a configuration including a retardation film with known retardation instead of the birefringence mode liquid crystal display panel 5. FIG. 5 is a schematic cross-sectional view of an evaluation sample including a retardation film. As illustrated in FIG. 5, the evaluation sample used had a configuration similar to that in Example 1, except that a retardation film 10 was used instead of the birefringence mode liquid crystal display panel 5.

The members constituting the evaluation sample were similar to those in Example 1, except that the retardation film 10 used was a laminate of a required number of uniaxially stretched transparent films made of a cycloolefin polymer (retardation of one film: 100 nm, thickness of one film: 30 μm) with an acrylic pressure-sensitive adhesive, the laminate introducing one of the five retardations of 300 nm, 400 nm, 500 nm, 600 nm, and 700 nm. The retardation of the retardation film 10 is a value measured with light having a wavelength of 550 nm.

(Evaluation Method)

External light incident on the absorptive polarizing plate 6a from the viewing surface side was emitted by a D65 light source. The simulation was conducted using a liquid crystal optical simulator (trade name: LCD Master) available from Shintec Co., Ltd. From the calculation results of the reflection spectra in the wavelength range of 380 nm to 780 nm, an xy chromaticity was calculated. The experiment was performed using a portable spectrophotometer (trade name: CM-2600d, integrating sphere type) available from Konica Minolta, Inc. with a reflection measurement mode of specular component included (SCI) mode. From the measurement results of the reflection spectra in the wavelength range of 380 nm to 780 nm, the xy chromaticity was calculated.

(Evaluation Results)

Figure 6:
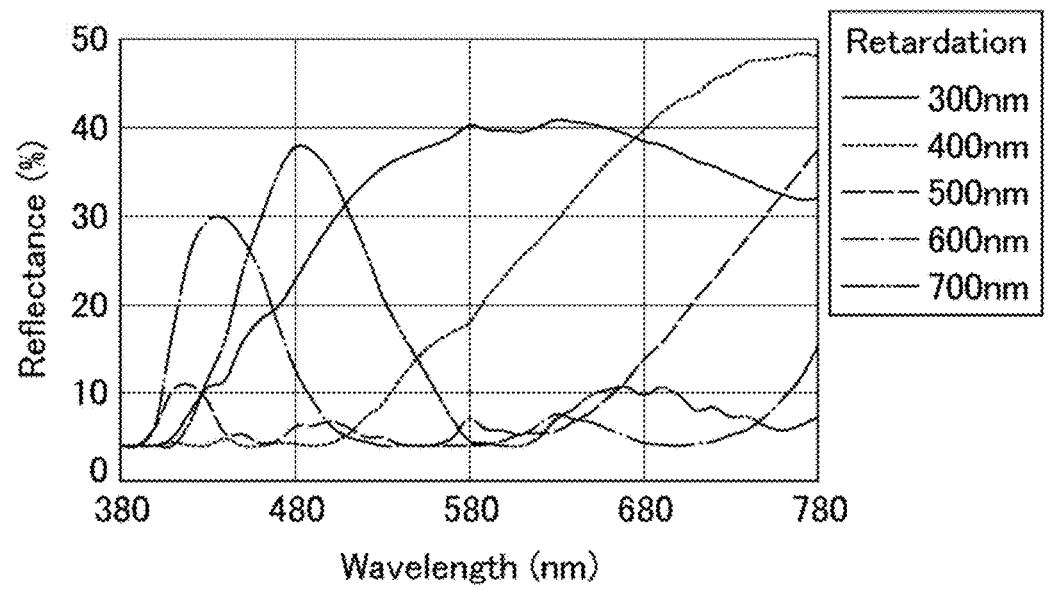
FIG. 6 is a graph showing the calculation results of reflection spectra of evaluation samples each including a retardation film (retardation: 300 nm, 400 nm, 500 nm, 600 nm, 700 nm).
Figure 7:
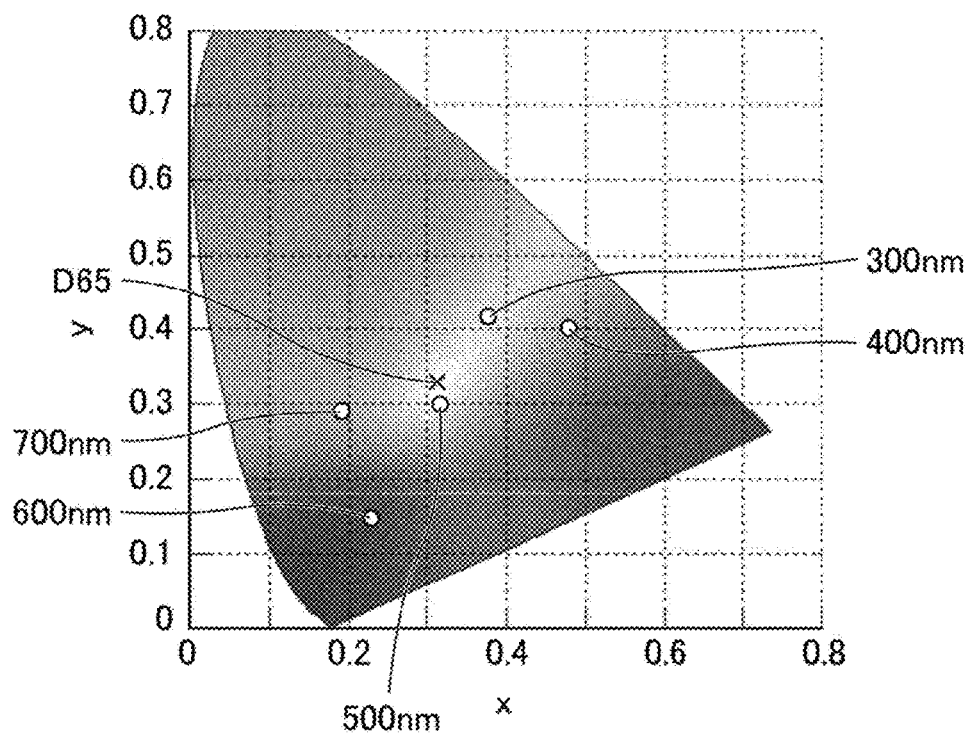
FIG. 7 is an xy chromaticity diagram derived from the calculation results in FIG. 6.
Figure 8:
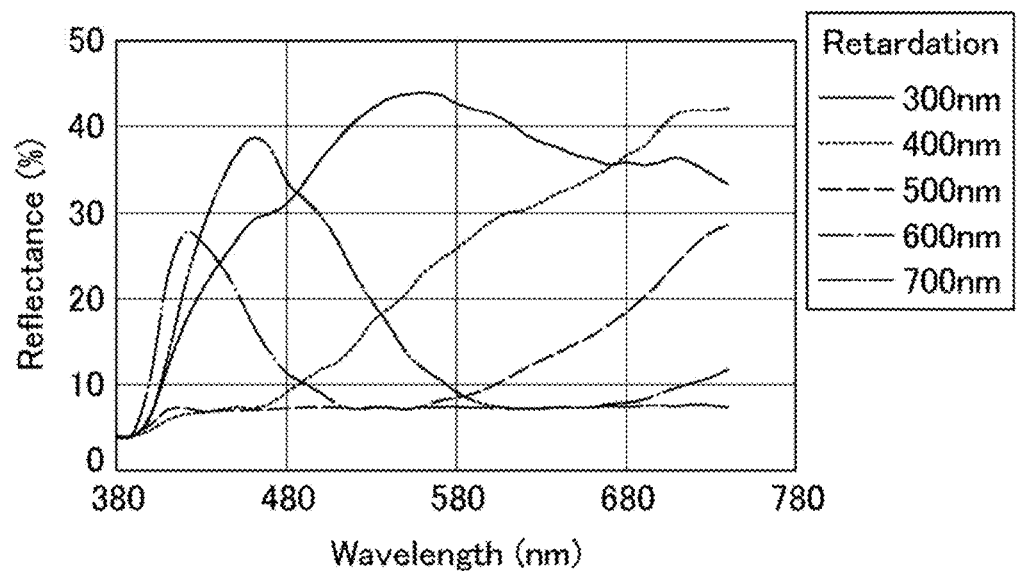
FIG. 8 is a graph showing the measurement results of reflection spectra of evaluation samples each including a retardation film (retardation: 300 nm, 400 nm, 500 nm, 600 nm, 700 nm).
Figure 9:
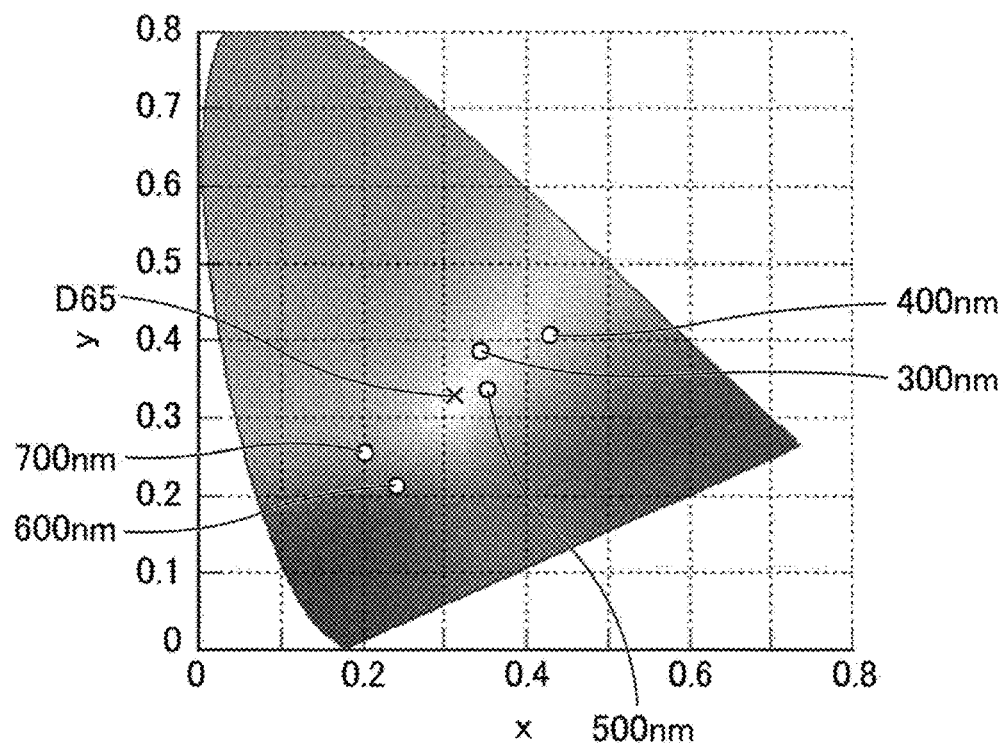
FIG. 9 is an xy chromaticity diagram derived from the measurement results in FIG. 8.

FIG. 6 is a graph showing the calculation results of reflection spectra of evaluation samples each including a retardation film (retardation: 300 nm, 400 nm, 500 nm, 600 nm, 700 nm). FIG. 7 is an xy chromaticity diagram derived from the calculation results in FIG. 6. FIG. 8 is a graph showing the measurement results of reflection spectra of evaluation samples each including a retardation film (retardation: 300 nm, 400 nm, 500 nm, 600 nm, 700 nm). FIG. 9 is an xy chromaticity diagram derived from the measurement results in FIG. 8. The symbols "o" in FIG. 7 and FIG. 9 indicate chromaticity points of reflected light corresponding to the cases where the respective retardation films were used. The symbol "x" in FIG. 7 and FIG. 9 indicates a chromaticity point of the D65 light source, i.e., the achromatic color point.

FIG. 7 and FIG. 9 confirm that reflection light can be displayed in various colors depending on the retardation values both in the simulations and experiments. The simulation results and the experiment results were qualitatively the same, and were quantitatively similar to, but not the same as, each other. The simulations and experiments therefore proved that the operation principle of the mirror display in the coloring mode as described above was correct, and that the color of reflected light in the mirror mode was adjustable by the effective retardation introduced by the birefringence mode liquid crystal display panel 5.

Figure 10:
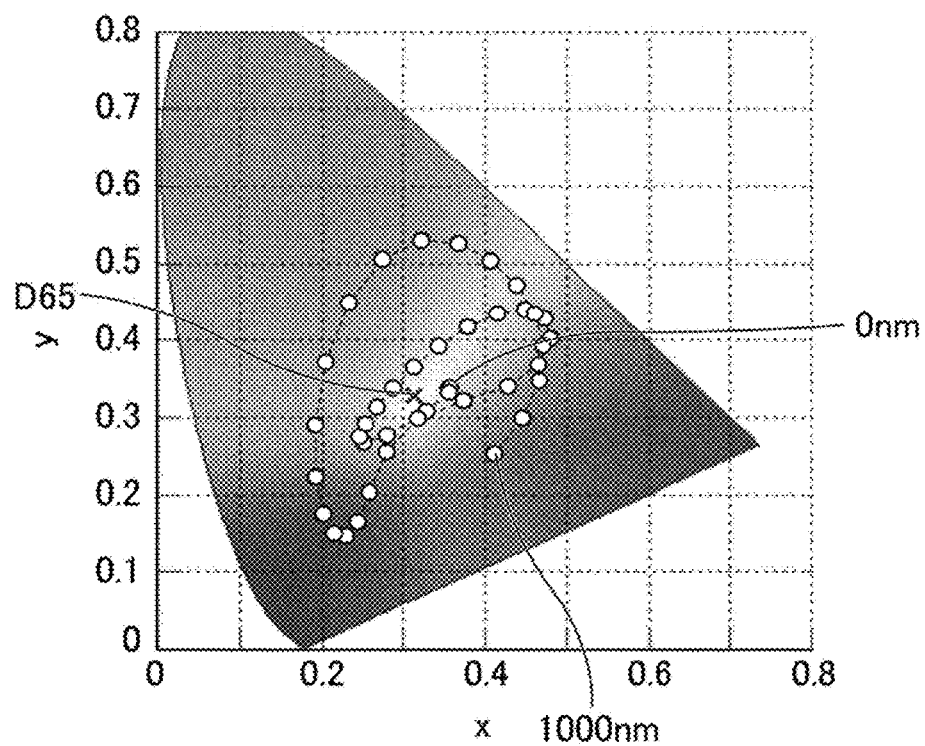
FIG. 10 is an xy chromaticity diagram derived from the simulation results of evaluation samples each including a retardation film (retardation: 0 nm to 1000 nm).
Figure 11:
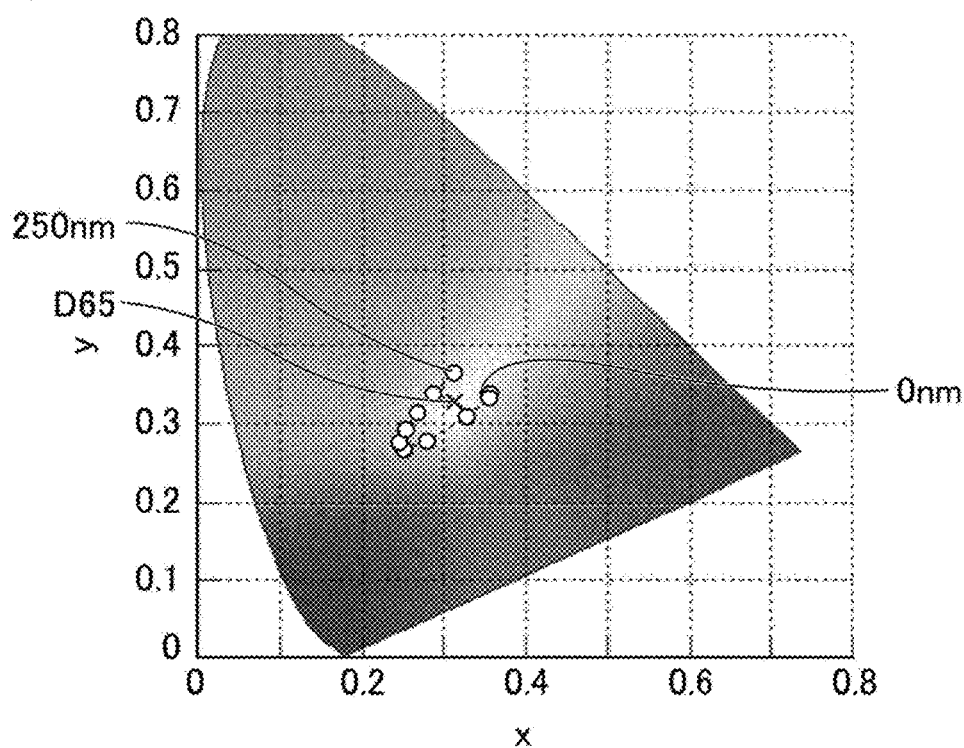
FIG. 11 is an xy chromaticity diagram with the results in the range of 0 nm to 250 nm shown in FIG. 10.
Figure 12:
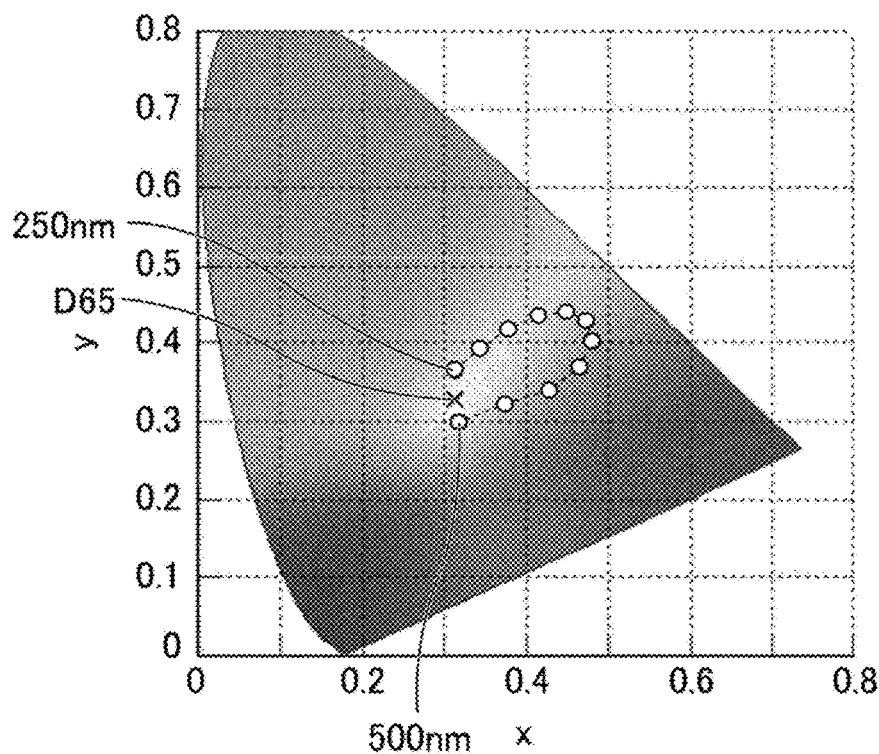
FIG. 12 is an xy chromaticity diagram with the results in the range of 250 nm to 500 nm shown in FIG. 10.
Figure 13:
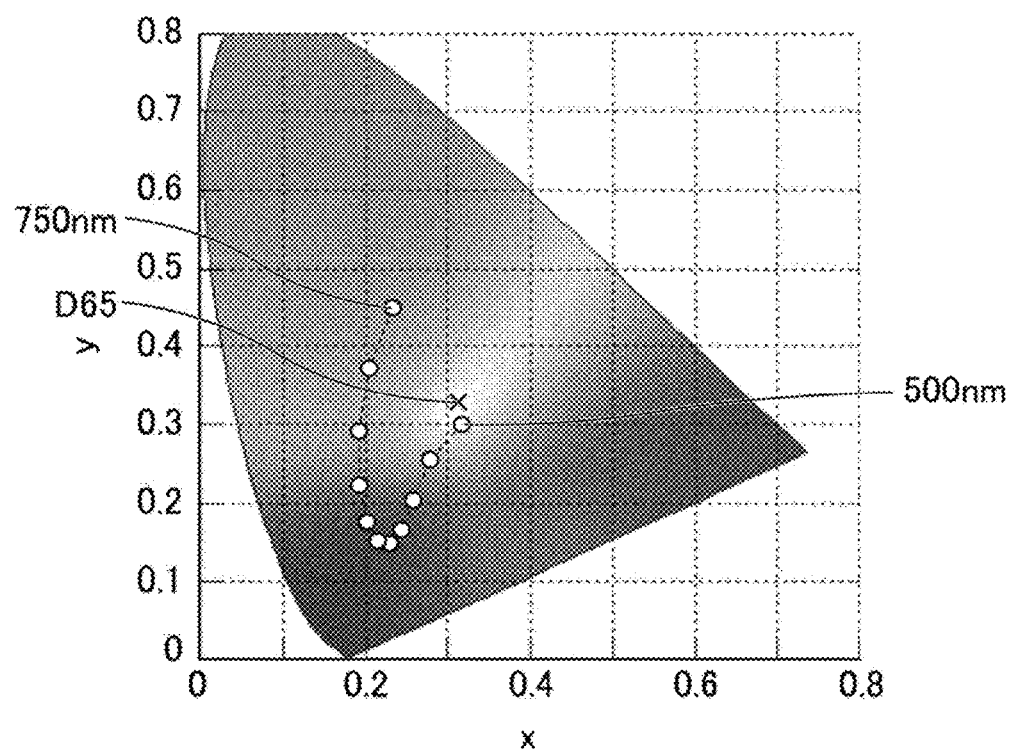
FIG. 13 is an xy chromaticity diagram with the results in the range of 500 nm to 750 nm shown in FIG. 10.
Figure 14:
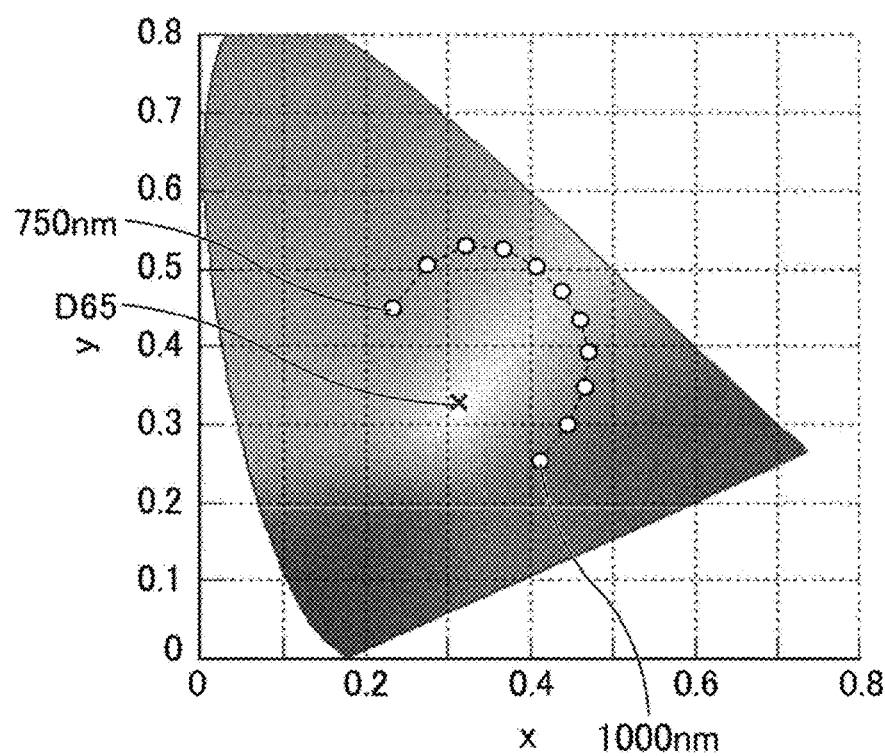
FIG. 14 is an xy chromaticity diagram with the results in the range of 750 nm to 1000 nm shown in FIG. 10.

In addition, a simulation was conducted and an xy chromaticity was calculated by similar methods to those described above for cases where a retardation film with a retardation other than the above five retardations (300 nm, 400 nm, 500 nm, 600 nm, 700 nm) was used. The retardation of the retardation film was changed in the range of 0 nm (the case with no retardation film) to 1000 nm, with 25-nm increments. The results are shown in FIG. 10. FIG. 10 is an xy chromaticity diagram derived from the simulation results of evaluation samples each including a retardation film (retardation: 0 nm to 1000 nm). For better viewing of each chromaticity point position in FIG. 10, the results are shown separately in four retardation ranges in FIGS. 11 to 14. FIG. 11 is an xy chromaticity diagram with the results in the range of 0 nm to 250 nm shown in FIG. 10. FIG. 12 is an xy chromaticity diagram with the results in the range of 250 nm to 500 nm shown in FIG. 10. FIG. 13 is an xy chromaticity diagram with the results in the range of 500 nm to 750 nm shown in FIG. 10. FIG. 14 is an xy chromaticity diagram with the results in the range of 750 nm to 1000 nm shown in FIG. 10. The symbols "o" in FIGS. 10 to 14 indicate chromaticity points of reflected light corresponding to the cases where the respective retardation films were used; the points appear to form a curved line (dotted line in each drawing) in ascending order of the retardation (with 25-nm increments). The symbol "x" in FIGS. 10 to 14 indicates a chromaticity point of the D65 light source, i.e., the achromatic color point.

FIGS. 10 to 14 confirm that reflection light can be displayed in various colors depending on the retardation values. Also, increasing the retardation to an even greater value was found to result in distribution of the chromaticity points of reflected light further from the chromaticity point (achromatic color point) of the D65 light source and the reflected light had higher chroma. Yet, as is clear from FIG. 11 and FIG. 12, the effect of the present invention cannot be achieved in a retardation range of 0 nm to 275 nm because a color close to yellow cannot be displayed as the color of reflected light.

[Evaluation Using Liquid Crystal Display Panel]

Next, simulations were conducted for Examples 1 to 4 and Comparative Examples 1 and 2.

(Simulation Method)

External light incident on the absorptive polarizing plate 6a (absorptive polarizing plates 106a and 106b) from the viewing surface side was emitted by the D65 light source. The simulation was conducted using a liquid crystal optical simulator (trade name: LCD Master) available from Shintec Co., Ltd. From the calculation results of the reflection spectra in the wavelength range of 380 nm to 780 nm, an xy chromaticity was calculated for the cases where variable voltage was applied in the range of 0 V to 7 V with 0.1-V increments between the substrates constituting the birefringence mode liquid crystal display panel 5 (optical rotation mode liquid crystal display panel 111) perpendicularly to the substrates.

(Simulation Result)

Figure 15:
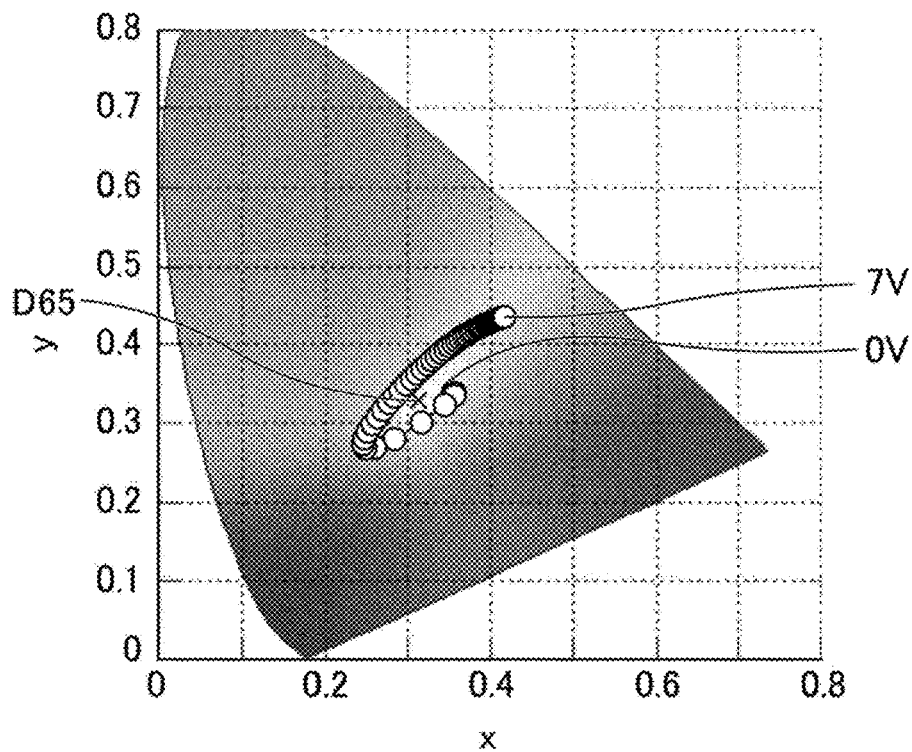
FIG. 15 is an xy chromaticity diagram derived from the simulation results in Example 1.
Figure 16:
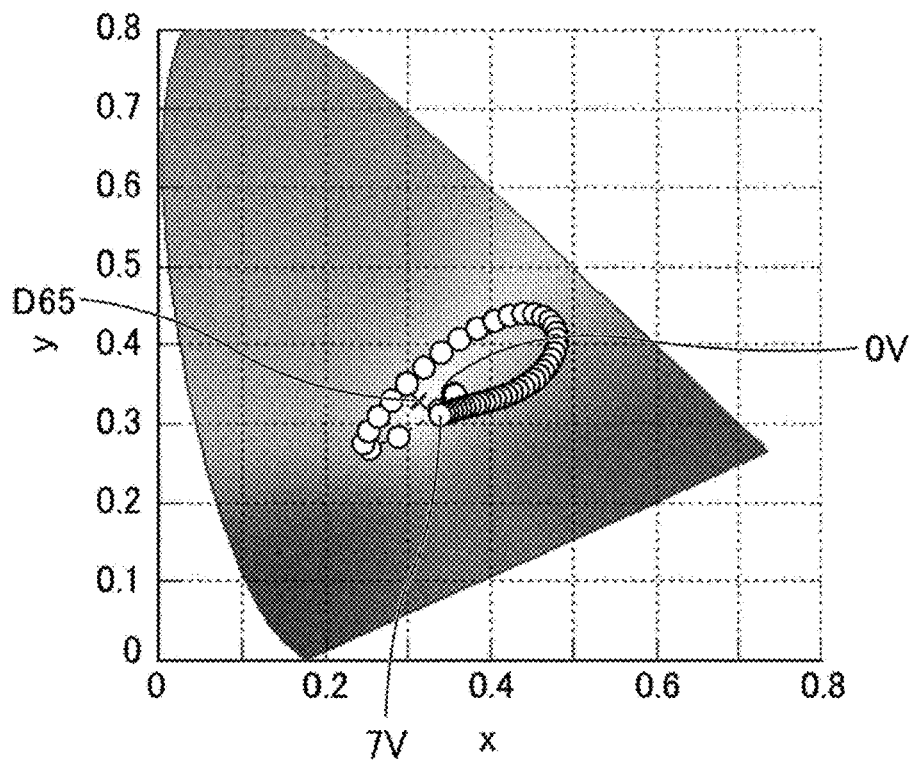
FIG. 16 is an xy chromaticity diagram derived from the simulation results in Example 2.
Figure 17:
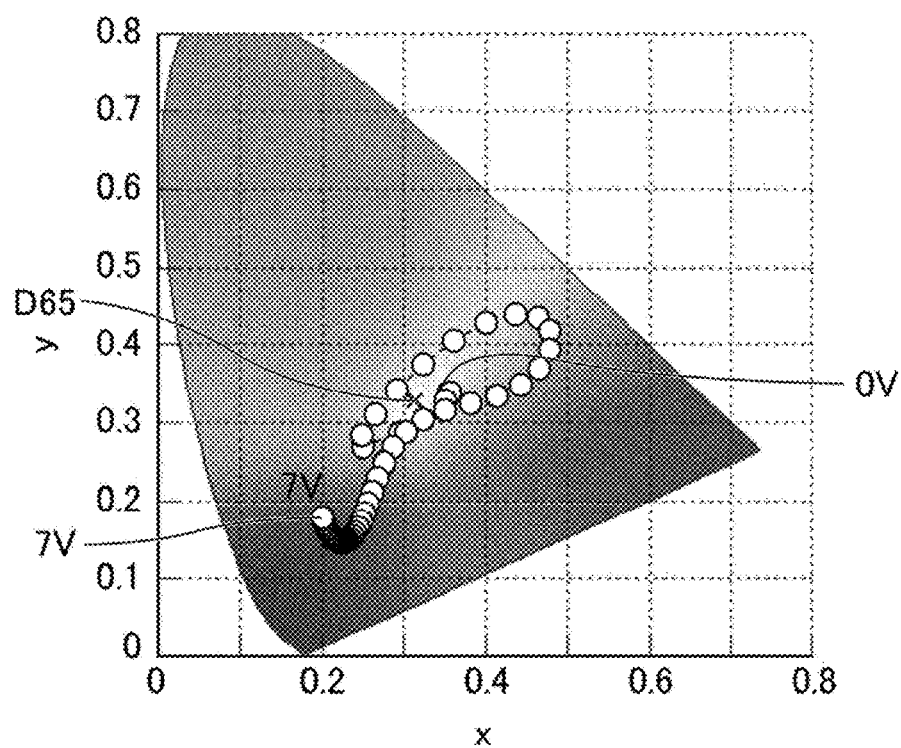
FIG. 17 is an xy chromaticity diagram derived from the simulation results in Example 3.
Figure 18:
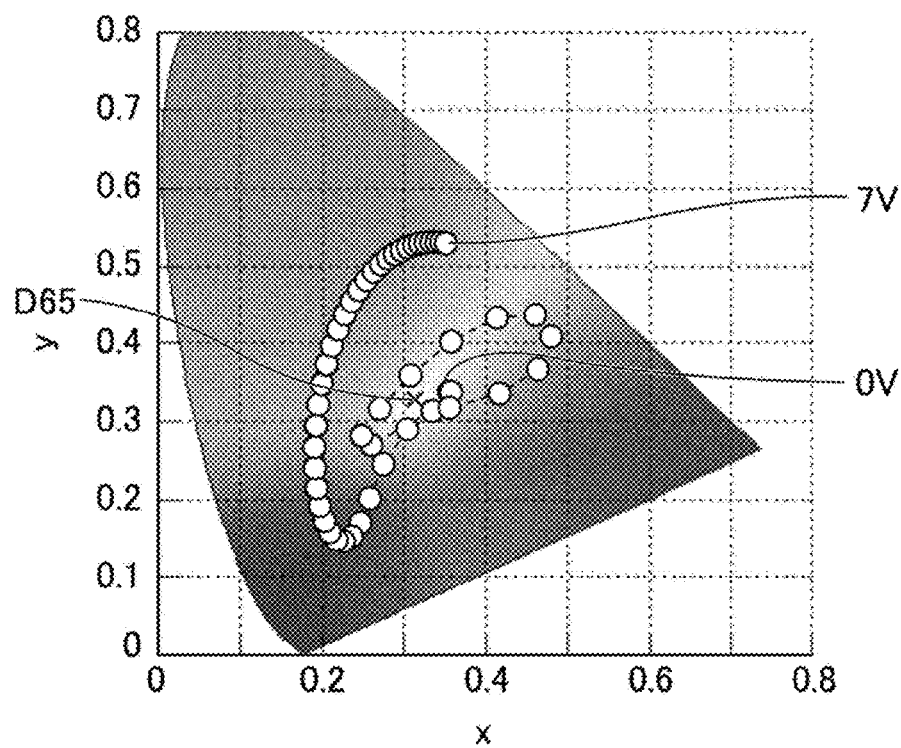
FIG. 18 is an xy chromaticity diagram derived from the simulation results in Example 4.

FIG. 15 is an xy chromaticity diagram derived from the simulation results in Example 1. FIG. 16 is an xy chromaticity diagram derived from the simulation results in Example 2. FIG. 17 is an xy chromaticity diagram derived from the simulation results in Example 3. FIG. 18 is an xy chromaticity diagram derived from the simulation results in Example 4. The symbols "o" in FIGS. 15 to 18 indicate chromaticity points of reflected light corresponding to the cases where the respective voltages were applied; the points appear to form a curved line (dotted line in each drawing) in ascending order of the applied voltage (with 0.1-V increments). The symbol "x" in FIGS. 15 to 18 indicates a chromaticity point of the D65 light source, i.e., the achromatic color point. The same shall apply to the later-described FIG. 19 and FIG. 21.

FIGS. 15 to 18 found that the birefringence mode liquid crystal display panel 5 with greater liquid crystal retardation gave chromaticity points of reflected light in a broader range, enabling display in a wider variety of colors. That is, greater liquid crystal retardation of the birefringence mode liquid crystal display panel 5 was found to be preferred for adjustment of the color of reflected light in a wide range, and Example 4 was found to be most preferred among Examples 1 to 4. Calculation based on the alignment state of the liquid crystal molecules obtained in each simulation found that the effective retardation in the case of applying a voltage of 7 V to the birefringence mode liquid crystal display panel 5 in each of Examples 1 to 4 was about 80% of the liquid crystal retardation. In other words, in the case where the birefringence mode liquid crystal display panel 5 is a VA mode liquid crystal display panel, more sufficient adjustment of the color of reflected light is enabled by a greater liquid crystal retardation than 343 nm (a 275 nm (effective retardation)/0.8) in measurement with light having a wavelength of 550 nm. For example, in Example 4 (liquid crystal retardation: 1000 nm), the effective retardation of the birefringence mode liquid crystal display panel 5 is adjustable in the range of 0 nm to about 800 nm under a collateral condition where the maximum applied voltage is 7 V. Accordingly, the color of reflected light in Example 4 can be any of the colors corresponding to the chromaticity points shown in FIG. 7 and FIG. 9. In contrast, in Example 1 (liquid crystal retardation: 400 nm), the effective retardation of the birefringence mode liquid crystal display panel 5 is adjustable in the range of 0 nm to about 320 nm under a collateral condition where the maximum applied voltage is 7 V. Accordingly, the color of reflected light in Example 1 can be a color close to yellow and green, but is not likely to be a color such as blue. Hence, also in consideration of the results shown in FIGS. 15 to 18, in the case where the birefringence mode liquid crystal display panel 5 is a VA mode liquid crystal display panel, the liquid crystal retardation thereof is preferably 400 nm or greater, more preferably 600 nm or greater, for sufficient adjustment of the color of reflected light. Although there is no upper limit of the liquid crystal retardation in terms of sufficient adjustment of the color of reflected light, there is the upper limit, which is preferably 1000 nm or less, for practicability of the method for producing the birefringence mode liquid crystal display panel 5 and the cost thereof. As is clear from FIG. 18, a liquid crystal retardation of 1000 nm is enough to enable sufficient adjustment of the color of reflected light.

Figure 19:
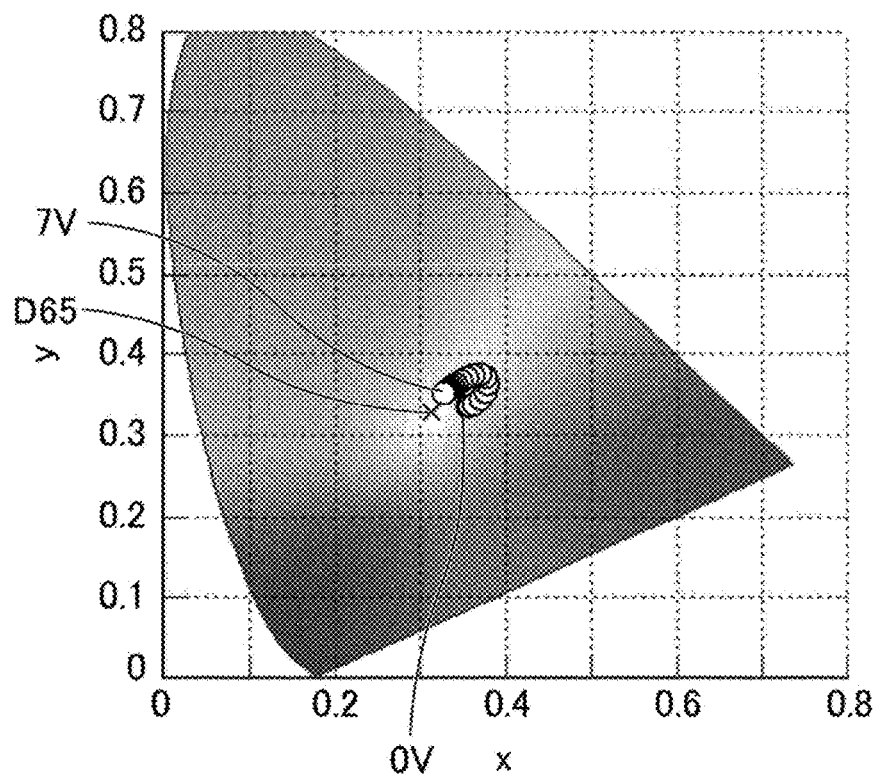
FIG. 19 is an xy chromaticity diagram derived from the simulation results in Comparative Example 1.
Figure 20:
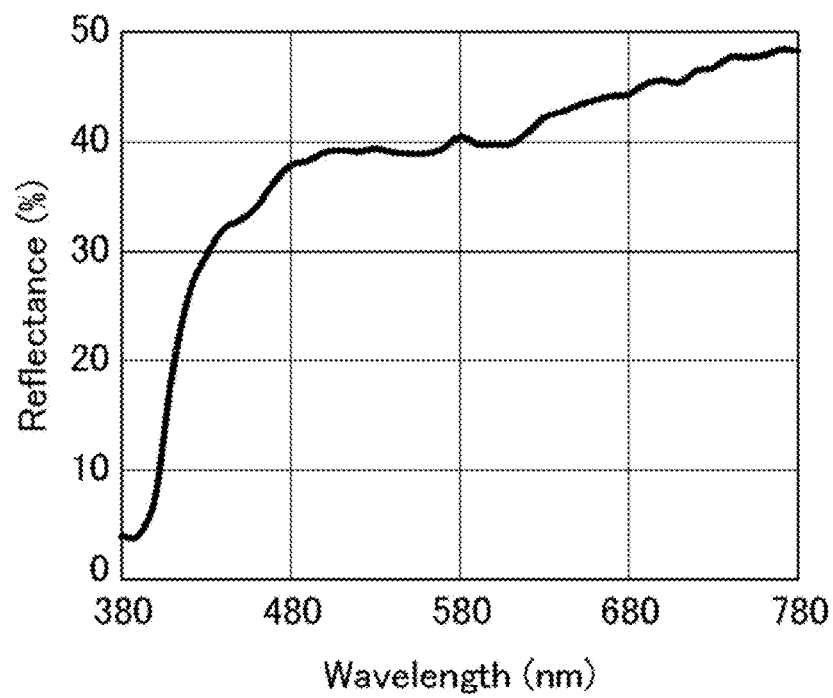
FIG. 20 is a graph showing the calculation result of the reflection spectrum in Comparative Example 1 (applied voltage: 4.8 V).

FIG. 19 is an xy chromaticity diagram derived from the simulation results in Comparative Example 1. FIG. 19 found that in Comparative Example 1, reflected light is hardly colored unlike the results in Examples 1 to 4 (FIGS. 15 to 18). The calculation result of the reflection spectrum when sufficient voltage (4.8 V) is applied to cause loss of optical rotation in the optical rotation mode liquid crystal display panel 111 is shown in FIG. 20. FIG. 20 is a graph showing the calculation result of the reflection spectrum in Comparative Example 1 (applied voltage: 4.8 V). As is clear from FIG. 20, the reflection spectrum is almost flat in a wide wavelength range, and thus the reflected light does not appear in color.

Figure 21:
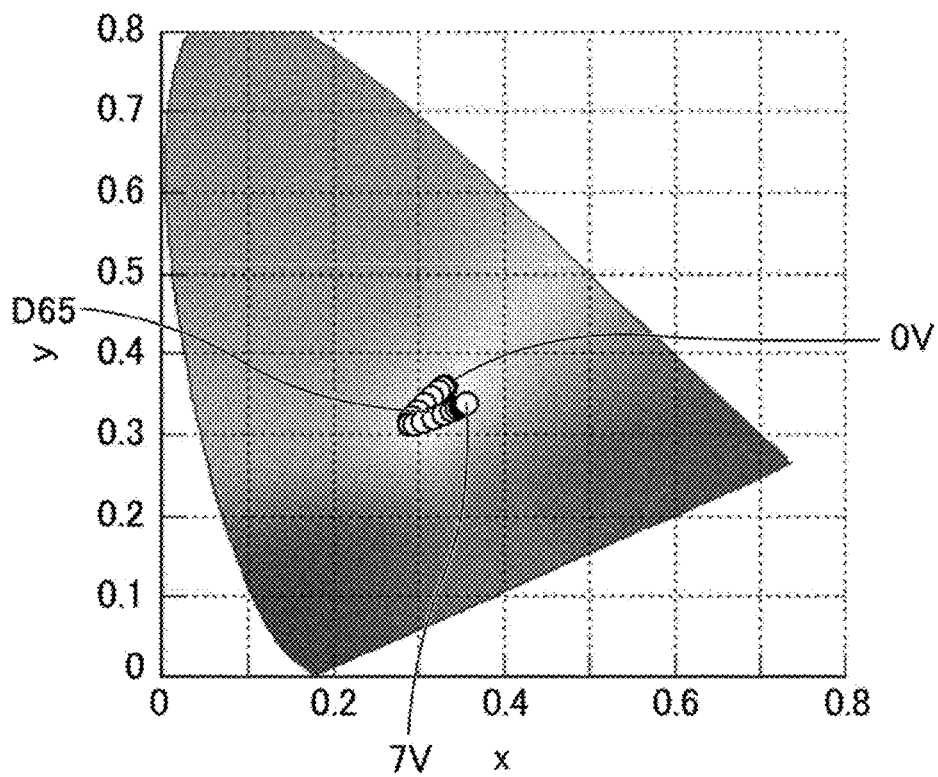
FIG. 21 is an xy chromaticity diagram derived from the simulation results in Comparative Example 2.
Figure 22:
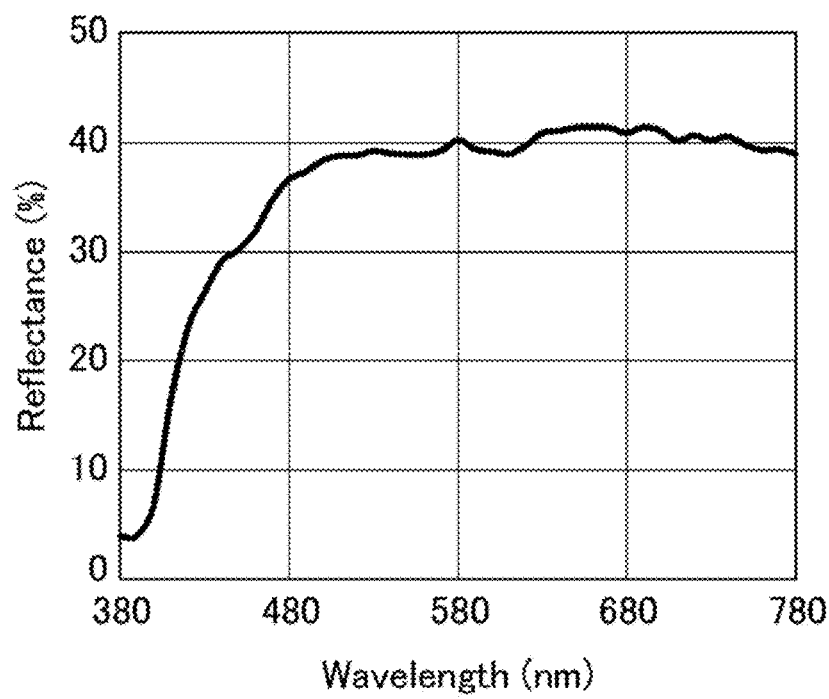
FIG. 22 is a graph showing the calculation result of the reflection spectrum in Comparative Example 2 (when no voltage is applied).

FIG. 21 is an xy chromaticity diagram derived from the simulation results in Comparative Example 2. FIG. 21 found that reflected light is hardly colored in Comparative Example 2 unlike the results in Examples 1 to 4 (FIGS. 15 to 18). The calculation result of the reflection spectrum when no voltage is applied to the optical rotation mode liquid crystal display panel 111 (state with optical rotation) is shown in FIG. 22. FIG. 22 is a graph showing the calculation result of the reflection spectrum in Comparative Example 2 (when no voltage is applied). As is clear from FIG. 22, the reflection spectrum is almost flat in a wide wavelength range, and thus the reflected light does not appear in color. That is, the optical rotation involves small wavelength dispersion.

EXAMPLE 5

The mirror display of Embodiment 1 was actually produced using the following members. The liquid crystal retardation of the birefringence mode liquid crystal display panel 5 is a value measured with light having a wavelength of 550 nm. Also, the azimuths of the transmission axis, reflection axis, and absorption axis, the alignment direction, and the rubbing direction are each defined to be positive (+) in the counterclockwise direction from the reference line (0°) which is the longitudinal direction (long side) of the mirror display.
<Liquid Crystal Display Panel 8 for Display>
TN mode liquid crystal display panel
Liquid crystal retardation: 476 nm
Rubbing direction of viewing surface side substrate: 45°
Rubbing direction of back surface side substrate: 225°
<Absorptive Polarizing Plate 6b>
Polarizer obtained by adsorption alignment of iodine complex on PVA film
Azimuth of transmission axis: 45°
Azimuth of absorption axis: −45°
<Absorptive Polarizing Plate 6c>
Polarizer obtained by adsorption alignment of iodine complex on PVA film
Azimuth of transmission axis: −45°
Azimuth of absorption axis: 45°
<Reflective Polarizing Plate 4>
Reflective polarizing plate (trade name: DBEF) available from Sumitomo 3M Ltd.
Azimuth of transmission axis: −45°
Azimuth of reflection axis: 45°
<Birefringence Mode Liquid Crystal Display Panel 5>
VA mode liquid crystal display panel
Liquid crystal retardation: 800 nm
Alignment direction (direction in which liquid crystal molecules tilt when voltage is applied): 0°
<Absorptive Polarizing Plate 6a>
Polarizer obtained by adsorption alignment of iodine complex on PVA film
Azimuth of transmission axis: −45°
Azimuth of absorption axis: 45°

EXAMPLE 6

A mirror display similar to that of Example 5 except for employing the birefringence mode liquid crystal display panel 5 shown below was produced.
<Birefringence Mode Liquid Crystal Display Panel 5>
ECB mode liquid crystal display panel
Liquid crystal retardation: 800 nm
Rubbing direction of viewing surface side substrate: 0°
Rubbing direction of back surface side substrate: 90°

EXAMPLE 7

The mirror display of Embodiment 1 was actually produced using the following members. The liquid crystal retardation of the birefringence mode liquid crystal display panel 5 is a value measured with light having a wavelength of 550 nm. Also, the azimuths of the transmission axis, reflection axis, and absorption axis and the alignment direction are each defined to be positive (+) in the counterclockwise direction from the reference line (0°) which is the longitudinal direction (long side) of the mirror display.
<Liquid Crystal Display Panel 8 for Display>
FFS mode liquid crystal display panel
Liquid crystal retardation: 340 nm
Alignment direction (alignment direction of liquid crystal molecules when no voltage is applied): 0°

<Absorptive Polarizing Plate 6b>
Polarizer obtained by adsorption alignment of iodine complex on PVA film
Azimuth of transmission axis: 90°
Azimuth of absorption axis: 0°
<Absorptive Polarizing Plate 6c>
Polarizer obtained by adsorption alignment of iodine complex on PVA film
Azimuth of transmission axis: 0°
Azimuth of absorption axis: 90°
<Reflective Polarizing Plate 4>
Reflective polarizing plate (trade name: DBEF) available from Sumitomo 3M Ltd.
Azimuth of transmission axis: 0°
Azimuth of reflection axis: 90°
<Birefringence Mode Liquid Crystal Display Panel 5>
VA mode liquid crystal display panel
Liquid crystal retardation: 800 nm
Alignment direction (direction in which liquid crystal molecules tilt when voltage is applied): 45°
<Absorptive Polarizing Plate 6a>
Polarizer obtained by adsorption alignment of iodine complex on PVA film
Azimuth of transmission axis: 0°
Azimuth of absorption axis: 90°

EXAMPLE 8

A mirror display similar to that of Example 7 except for employing the birefringence mode liquid crystal display panel 5 shown below was produced.
<Birefringence mode liquid crystal display panel 5>
ECB mode liquid crystal display panel
Liquid crystal retardation: 800 nm
Rubbing direction of viewing surface side substrate: 45°
Rubbing direction of back surface side substrate: 225°

EXAMPLE 9

Figure 23:
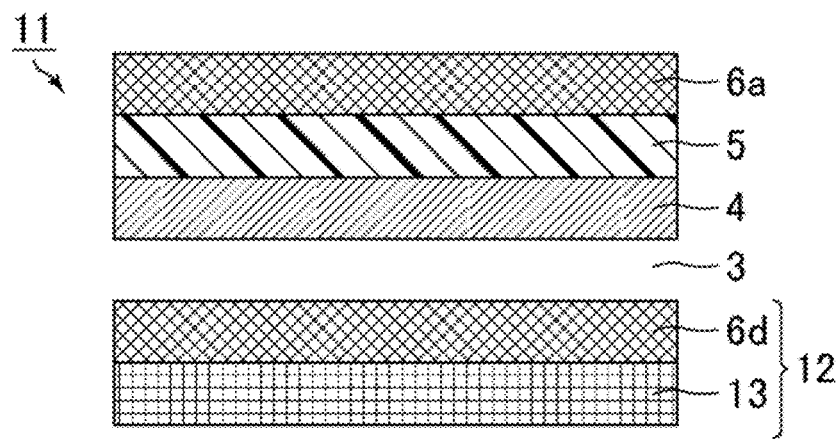
FIG. 23 is a schematic cross-sectional view of a mirror display of Example 9.

FIG. 23 is a schematic cross-sectional view of a mirror display of Example 9. As illustrated in FIG. 23, a mirror display 11 was similar to the mirror display of Example 5 except that an organic electroluminescent display device 12 was disposed instead of the liquid crystal display device 2. The organic electroluminescent display device 12 included an organic electroluminescent display panel 13 and an absorptive circular polarizing plate (laminate of an absorptive polarizing plate and a λ/4 plate) 6d in the stated order from the back surface side to the viewing surface side. The organic electroluminescent display device 12 used was an organic electroluminescent display device including an antireflection absorptive circular polarizing plate which was mounted on a smartphone (product name: Galaxy S6) available from Samsung Electronics Co., Ltd.

EXAMPLE 10

A mirror display similar to that of Example 9 except for employing the birefringence mode liquid crystal display panel 5 shown below was produced.
<Birefringence Mode Liquid Crystal Display Panel 5>
ECB mode liquid crystal display panel
Liquid crystal retardation: 800 nm
Rubbing direction of viewing surface side substrate: 0°
Rubbing direction of back surface side substrate: 90°

COMPARATIVE EXAMPLE 3

Figure 24:
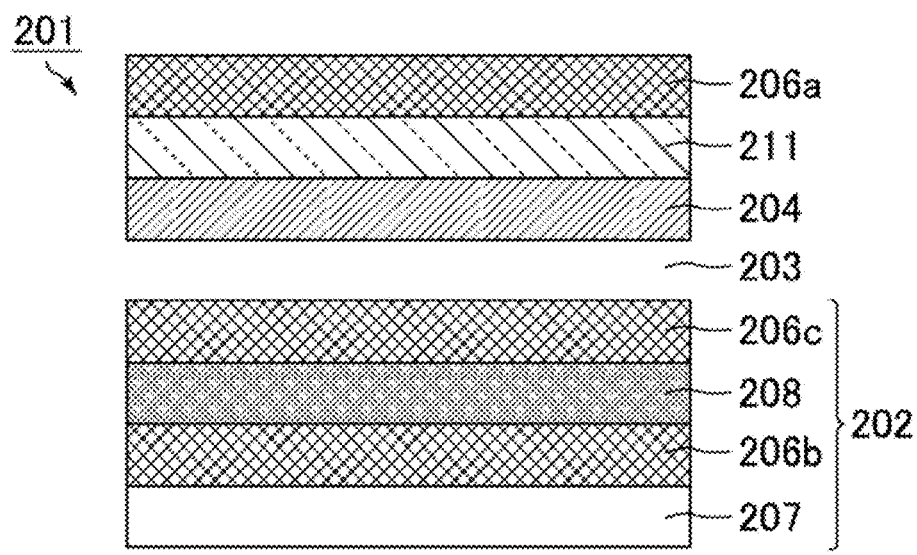
FIG. 24 is a schematic cross-sectional view of a mirror display of Comparative Example 3.

FIG. 24 is a schematic cross-sectional view of a mirror display of Comparative Example 3. As illustrated in FIG. 24, a mirror display 201 included a liquid crystal display device 202, an air layer 203, a reflective polarizing plate 204, an optical rotation mode liquid crystal display panel 211, and an absorptive polarizing plate 206a in the stated order from the back surface side to the viewing surface side. The liquid crystal display device 202 included a backlight 207, an absorptive polarizing plate 206b, a liquid crystal display panel 208 for display, and an absorptive polarizing plate 206c in the stated order from the back surface side to the viewing surface side.

The members constituting the mirror display of Comparative Example 3 are listed below. The liquid crystal retardation of the optical rotation mode liquid crystal display panel 211 is a value measured with light having a wavelength of 550 nm. Also, the azimuths of the transmission axis, reflection axis, and absorption axis and the rubbing direction are each defined to be positive (+) in the counterclockwise direction from the reference line (0°) which is the longitudinal direction (long side) of the mirror display.
<Liquid Crystal Display Panel 208 for Display>
TN mode liquid crystal display panel
Liquid crystal retardation: 476 nm
Rubbing direction of viewing surface side substrate: 45°
Rubbing direction of back surface side substrate: 225°
<Absorptive Polarizing Plate 206b>
Polarizer obtained by adsorption alignment of iodine complex on PVA film
Azimuth of transmission axis: 45°
Azimuth of absorption axis: −45°
<Absorptive Polarizing Plate 206c>
Polarizer obtained by adsorption alignment of iodine complex on PVA film
Azimuth of transmission axis: −45°
Azimuth of absorption axis: 45°
<Reflective Polarizing Plate 204>
Reflective polarizing plate (trade name: DBEF) available from Sumitomo 3M Ltd.
Azimuth of transmission axis: −45°
Azimuth of reflection axis: 45°
<Optical Rotation Mode Liquid Crystal Display Panel 211>
TN mode liquid crystal display panel
Liquid crystal retardation: 476 nm
Rubbing direction of viewing surface side substrate: 45°
Rubbing direction of back surface side substrate: 225°
<Absorptive Polarizing Plate 206a>
Polarizer obtained by adsorption alignment of iodine complex on PVA film
Azimuth of transmission axis: 45°
Azimuth of absorption axis: −45°
[Evaluation on Mirror Display]

The non-coloring mode performance and the coloring mode performance of the mirror displays of Examples 5 to 10 and Comparative Example 3 were evaluated. The results are shown in Table 1.

(Evaluation on Non-Coloring Mode Performance)

In each example, the luminance L1 of the display device (liquid crystal display device 2, organic electroluminescent display device 12, and liquid crystal display device 202) alone was measured from the viewing surface side. After production of the mirror display of each example, the luminance L2 of the mirror display in the non-coloring mode was measured from the viewing surface side. Using the luminance L1 and the luminance L2, the transmittance (unit: %) in the non-coloring mode=100×L2/L1 was calculated. The luminance L1 and the luminance L2 were measured with a spectroradiometer (trade name: SR-UL1) available from Topcon Corporation, and were each a Y value obtained through luminous correction.

(Evaluation on Coloring Mode Performance)

Fifteen observers visually observed the mirror display of each example in the coloring mode from the viewing surface side, and determined whether or not the reflected light appeared in color. The evaluation indexes used were Good: half or more of the observers (8 or more observers) determined that the reflected light appeared in color and Poor: more than half of the observers (8 or more observers) determined that the reflected light did not appear in color.

TABLE 1

|  | Non-coloring mode performance Transmittance (%) | Coloring mode performance Visual observation |
| --- | --- | --- |
| Example 5 | 80 | Good |
| Example 6 | 75 | Good |
| Example 7 | 80 | Good |
| Example 8 | 75 | Good |
| Example 9 | 80 | Good |
| Example 10 | 75 | Good |
| Comparative Example 3 | 82 | Poor |

As shown in Table 1, the transmittance in the non-coloring mode in each of Examples 5 to 10 was higher than 70%, and deterioration of the display quality in the display mode was reduced. For example, the transmittance of a mirror display utilizing a common half mirror layer is 50% or lower, and the transmittance of the mirror display in each of Examples 5 to 10 was sufficiently higher than this value. Also, the reflected light was likely to appear in color in each of Examples 5 to 10, meaning that the coloring mode performance was excellent.

In contrast, the transmittance in the non-coloring mode in Comparative Example 3 was higher than 70%, but the coloring mode performance was inferior.

[Additional Remarks]

Examples of preferred characteristics of the mirror display of the present invention are described below. The examples may appropriately be combined within the spirit of the present invention.

In the mirror display of the present invention, the transmission axis of the polarizing plate in the display device and the transmission axis of the reflective polarizing plate are preferably parallel or perpendicular to each other. Examples of the configuration in which the transmission axis of the polarizing plate and the transmission axis of the reflective polarizing plate are in the above relationship include the following ones.

In the case where the display device includes one polarizing plate (for example, in the case where an anti-reflection absorptive circular polarizing plate is provided in the organic electroluminescent display device) or in the case where the display device includes polarizing plates whose transmission axes are parallel to each other (for example, in the case where the liquid crystal display device includes paired polarizing plates disposed in parallel Nicols) and the reflective polarizing plate includes a multilayer reflective polarizing plate, a configuration is preferred in which the transmission axis of the reflective polarizing plate is parallel to the transmission axis of each of the polarizing plates in the display device. In contrast, in the case where one of paired polarizing plates disposed in crossed Nicols in the liquid crystal display device closer to the reflective polarizing plate (typically, on the viewing surface side) is removed and the function thereof is conducted by the multilayer reflective polarizing plate, the other polarizing plate in the liquid crystal display device farther from the reflective polarizing plate (typically, on the back surface side) and the multilayer reflective polarizing plate are disposed in crossed Nicols. Hence, a configuration is preferred in which the transmission axis of the reflective polarizing plate is perpendicular to the transmission axis of the polarizing plate in the liquid crystal display device.

In the case where the display device includes paired polarizing plates whose transmission axes are perpendicular to each other (for example, in the case where the liquid crystal display device includes paired polarizing plates disposed in crossed Nicols) and the reflective polarizing plate includes a multilayer reflective polarizing plate, a configuration is preferred in which the transmission axis of the reflective polarizing plate is parallel to the transmission axis of one of the polarizing plates closer to the reflective polarizing plate (typically, on the viewing surface side). In this configuration, the transmission axis of the polarizing plate farther from the reflective polarizing plate (typically, on the back surface side) and the transmission axis of the reflective polarizing plate are perpendicular to each other.

The liquid crystal display panel may align liquid crystal molecules having negative anisotropy of dielectric constant perpendicularly to a substrate surface when no voltage is applied. Based on this condition, the concept of the present invention can be favorable even in the case where the liquid crystal display panel is what is called a VA mode liquid crystal display panel.

The liquid crystal display panel may have a liquid crystal retardation of greater than 343 nm in measurement with light having a wavelength of 550 nm. Based on this condition, the effective retardation introduced in the case where the liquid crystal display panel is a VA mode liquid crystal display panel is greater than 275 nm in measurement with light having a wavelength of 550 nm, which allows adjustment of the color of the reflected light in the coloring mode.

The display device may be a liquid crystal display device. Based on this condition, the concept of the present invention can be favorable even in the case where the display device is a liquid crystal display device. Furthermore, combination use with the reflective polarizer achieves both the visibility of images in the display mode and the visibility of mirror images in the mirror mode. Any display devices that includes polarizing plates may be used, and examples thereof other than liquid crystal display devices include display devices emitting polarized light such as organic electroluminescent display devices including anti-reflection absorptive circular polarizing plates and MEMS displays to which polarizing plates are attached. The display device may also be what is called a 3D compatible display which provides three-dimensional (3D) video images. A 3D compatible display can provide natural sense of depth in the display region as well as the mirror region, which enhances the design of the mirror display and enables use of the mirror display in various applications. Any display style for providing three-dimensional video images may be employed for the 3D compatible display, and preferred are naked-eye displays which do not require glasses. Examples of the naked-eye 3D compatible displays include displays with lenticular lenses and displays with parallax barriers.

REFERENCE SIGNS LIST

1, 11, 201: mirror display
2, 202: liquid crystal display device 3, 103, 203: air layer
4, 104, 204: reflective polarizing plate
5: birefringence mode liquid crystal display panel
6a, 6b, 6c, 106a, 106b, 206a, 206b, 206c: absorptive polarizing plate
6d: absorptive circular polarizing plate
7, 207: backlight
8, 208: liquid crystal display panel for display
9, 109: light absorber
10: retardation film
12: organic electroluminescent display device
13: organic electroluminescent display panel
111, 211: optical rotation mode liquid crystal display panel

The invention claimed is:

1. A mirror display comprising, in the following order from the back surface side:
  a display device including a polarizing plate;
  a reflective polarizing plate;
  a birefringence mode liquid crystal display panel; and
  an absorptive polarizing plate,
  the reflective polarizing plate including a transmission axis parallel to the transmission axis of the absorptive polarizing plate,
  the liquid crystal display panel being capable of switching, in transmission of incident polarized light, between a non-coloring mode of not altering the polarization state of the polarized light and a coloring mode of altering the polarization state of the polarized light,
  the liquid crystal display panel selecting the coloring mode when the display device is in a non-display state,
  the liquid crystal display panel in the coloring mode increasing a retardation to a value greater than 275 nm in measurement with light having a wavelength of 550 nm.

2. The mirror display according to claim 1,
wherein the liquid crystal display panel aligns liquid crystal molecules having negative anisotropy of dielectric constant perpendicularly to a substrate surface when no voltage is applied.

3. The mirror display according to claim 2,
wherein the liquid crystal display panel has a liquid crystal retardation of greater than 343 nm in measurement with light having a wavelength of 550 nm.

4. The mirror display according to claim 1,
wherein the display device is a liquid crystal display device.

* * * * *